United States Patent
Singla et al.

(10) Patent No.: US 12,149,644 B2
(45) Date of Patent: Nov. 19, 2024

(54) MACHINE LEARNING ON A BLOCKCHAIN

(71) Applicant: SAMSUNG ELECTRONICS CO., LTD., Suwon-si (KR)

(72) Inventors: Kushal Singla, Bangalore (IN); Joy Bose, Bangalore (IN); Sharvil Manish Katariya, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 880 days.

(21) Appl. No.: 17/050,242

(22) PCT Filed: Apr. 25, 2019

(86) PCT No.: PCT/KR2019/005034
§ 371 (c)(1),
(2) Date: Oct. 23, 2020

(87) PCT Pub. No.: WO2019/209059
PCT Pub. Date: Oct. 31, 2019

(65) Prior Publication Data
US 2021/0272017 A1    Sep. 2, 2021

(30) Foreign Application Priority Data

Apr. 25, 2018 (IN) .............................. 201841015708
Apr. 24, 2019 (IN) .............................. 201841015708

(51) Int. Cl.
*H04L 9/00* (2022.01)
*G06F 18/214* (2023.01)
(Continued)

(52) U.S. Cl.
CPC ............ *H04L 9/50* (2022.05); *G06F 18/2155* (2023.01); *G06N 20/00* (2019.01); *H04L 9/0643* (2013.01);
(Continued)

(58) Field of Classification Search
CPC . G06N 3/04; G06N 5/01; G06N 20/00; H04L 67/125; H04L 9/0643; H04L 9/50; G06F 18/2155
See application file for complete search history.

(56) References Cited

U.S. PATENT DOCUMENTS

| 8,402,543 B1 * | 3/2013 | Ranjan ................ H04L 63/1416 713/100 |
| 9,706,406 B1 * | 7/2017 | Adams .................... G06F 21/32 |

(Continued)

FOREIGN PATENT DOCUMENTS

| CN | 107025205 A | 8/2017 |
| WO | 2017189533 A1 | 11/2017 |

(Continued)

OTHER PUBLICATIONS

Communication dated Mar. 25, 2021, issued by the Intellectual Property India in Indian Patent Application No. 201841015708.

(Continued)

*Primary Examiner* — Jeremy L Stanley
(74) *Attorney, Agent, or Firm* — Sughrue Mion, PLLC

(57) ABSTRACT

According to an embodiment, there is provided an electronic device comprising: a memory storing instructions; and at least one processor configured to execute the instructions to: in response to an input, identify a dataset to be processed for responding to the input; divide the dataset into a plurality of sub-datasets; identify at least one electronic device which processes at least one sub-dataset; assign the at least one sub-dataset to the at least one electronic device to process the at least one sub-dataset; and receive from the at least one electronic device at least one output of the processed at least one sub-dataset to generate a response to the input.

19 Claims, 18 Drawing Sheets

(51) Int. Cl.
*G06N 3/04* (2023.01)
*G06N 5/01* (2023.01)
*G06N 20/00* (2019.01)
*H04L 9/06* (2006.01)
*H04L 67/125* (2022.01)

(52) U.S. Cl.
CPC .............. *H04L 67/125* (2013.01); *G06N 3/04* (2013.01); *G06N 5/01* (2023.01)

(56) References Cited

U.S. PATENT DOCUMENTS

| | | | |
|---|---|---|---|
| 10,764,125 B2* | 9/2020 | Zhang | G06F 9/5027 |
| 10,929,717 B2* | 2/2021 | Liu | G06F 18/253 |
| 11,222,046 B2* | 1/2022 | Zhang | G06N 20/20 |
| 11,244,387 B1* | 2/2022 | Tarmann | G06Q 40/03 |
| 2005/0246803 A1* | 11/2005 | Spencer | G06F 9/5027 |
| | | | 710/62 |
| 2009/0030862 A1* | 1/2009 | King | G06F 18/214 |
| | | | 706/45 |
| 2012/0016816 A1* | 1/2012 | Yanase | G06N 20/20 |
| | | | 706/10 |
| 2015/0061863 A1* | 3/2015 | Barfield, Jr. | G08B 21/0446 |
| | | | 340/539.11 |
| 2015/0193695 A1* | 7/2015 | Cruz Mota | H04L 63/1425 |
| | | | 706/12 |
| 2016/0224803 A1* | 8/2016 | Frank | G06F 21/6245 |
| 2017/0097970 A1* | 4/2017 | Bendel | G06F 16/254 |
| 2017/0103167 A1* | 4/2017 | Shah | G06Q 10/101 |
| 2017/0220949 A1* | 8/2017 | Feng | H04L 41/16 |
| 2017/0279620 A1* | 9/2017 | Kravitz | H04L 63/0876 |
| 2018/0018590 A1* | 1/2018 | Szeto | G16H 50/20 |
| 2018/0025287 A1* | 1/2018 | Mathew | G06N 5/04 |
| | | | 706/12 |
| 2018/0150758 A1* | 5/2018 | Niininen | H04L 41/147 |
| 2018/0232663 A1* | 8/2018 | Ross | G06N 3/045 |
| 2018/0240041 A1* | 8/2018 | Koch | G06N 3/126 |
| 2018/0331897 A1* | 11/2018 | Zhang | G06N 20/00 |
| 2019/0012595 A1* | 1/2019 | Beser | G06N 3/08 |
| 2019/0034766 A1* | 1/2019 | Chen | G06V 10/82 |
| 2019/0037040 A1* | 1/2019 | Kasaragod | H04L 67/125 |
| 2019/0042884 A1* | 2/2019 | Guim Bernat | G06N 3/08 |
| 2019/0042937 A1* | 2/2019 | Sheller | G06N 3/08 |
| 2019/0049966 A1* | 2/2019 | Poornachandran | G01C 21/005 |
| 2019/0057382 A1* | 2/2019 | Wright | H04L 9/321 |
| 2019/0095805 A1* | 3/2019 | Tristan | G06N 5/045 |
| 2019/0095992 A1* | 3/2019 | Soh | G07F 19/20 |
| 2019/0138339 A1* | 5/2019 | Hacker | G06F 9/45558 |
| 2019/0164136 A1* | 5/2019 | Gray | G06F 16/27 |
| 2019/0188787 A1* | 6/2019 | Besanson Tuma | H04L 9/0637 |
| 2019/0205773 A1* | 7/2019 | Ackerman | H03K 19/18 |
| 2019/0220703 A1* | 7/2019 | Prakash | G06V 10/95 |
| 2019/0228006 A1* | 7/2019 | Tormasov | H04L 9/3239 |
| 2019/0236559 A1* | 8/2019 | Padmanabhan | G06Q 20/02 |
| 2019/0236598 A1* | 8/2019 | Padmanabhan | G06Q 20/389 |
| 2019/0268163 A1* | 8/2019 | Nadeau | H04L 9/0891 |
| 2019/0279111 A1* | 9/2019 | Merrill | G06N 20/20 |
| 2019/0287026 A1* | 9/2019 | Calmon | G06N 20/00 |
| 2019/0303790 A1* | 10/2019 | Harvilla | G06Q 20/3567 |
| 2019/0311247 A1* | 10/2019 | Yang | G06N 3/045 |
| 2019/0318268 A1* | 10/2019 | Wang | H04L 67/10 |
| 2019/0325275 A1* | 10/2019 | Lee | G06V 30/19167 |
| 2019/0325700 A1* | 10/2019 | Jayachandran | G07F 17/3225 |
| 2019/0333612 A1* | 10/2019 | Brown | G16H 10/60 |
| 2020/0089509 A1* | 3/2020 | Arya | G06F 9/4482 |
| 2020/0193717 A1* | 6/2020 | Daly | H04L 9/3297 |
| 2020/0204350 A1* | 6/2020 | Kramer | G06Q 10/10 |
| 2021/0073212 A1* | 3/2021 | Conley | H04L 9/3213 |
| 2021/0073811 A1* | 3/2021 | Chan | H04L 9/32 |
| 2021/0117869 A1* | 4/2021 | Plumbley | G06F 18/217 |
| 2022/0138550 A1* | 5/2022 | Zhang | G06N 3/063 |
| | | | 706/25 |

FOREIGN PATENT DOCUMENTS

| | | | |
|---|---|---|---|
| WO | 2017220115 A1 | 12/2017 | |
| WO | 2017220165 A1 | 12/2017 | |

OTHER PUBLICATIONS

Kuo., T-T., et al., "ModelChain Decentralized Privacy-Preserving Healthcare Predictive Modeling Framework on Private Blockchain Networks", arXiv:1802.01746v1, Feb. 6, 2018, https://arxiv.org/ftp/arxiv/papers/1802/1802.01746.pdf, pp. 1-13 (14 pages).

International Search Report (PCT/ISA/210) and Written Opinion (PCT/ISA/237) dated Aug. 6, 2019 issued by the International Searching Authority in International Application No. PCT/KR2019/005034.

Communication dated Jun. 8, 2022, issued by the European Patent Office in counterpart European Application No. 19791853.5.

Kim et al., "SplitNet: Learning to Semantically Split Deep Networks for Parameter Reduction and Model Parallelization," International Conference on Machine Learning, PMLR, Jul. 2017, XP055534564, Total 9 pages.

Communication dated Feb. 18, 2021, issued by the European Patent Office in European Application No. 19791853.5.

Han Hu et al., "Toward Scalable Systems for Big Data Analytics: A Technology Tutorial", IEEE Access, Jun. 24, 2014, vol. 2, pp. 652-687 (36 pages total).

A. Besir Kurtulmus et al., "Trustless Machine Learning Contracts; Evaluating and Exchanging Machine Learning Models on the Ethereum Blockchain", Corr (Arxiv), Feb. 27, 2018, pp. 1-11 (11 pages total).

Communication issued Mar. 21, 2024 by the European Patent Office in European Patent Application No. 19791853.5.

Communication dated Jun. 20, 2024 issued by the CN Intellectual Property Administration in CN Application No. 201980027933.0.

* cited by examiner

[Fig. 1]
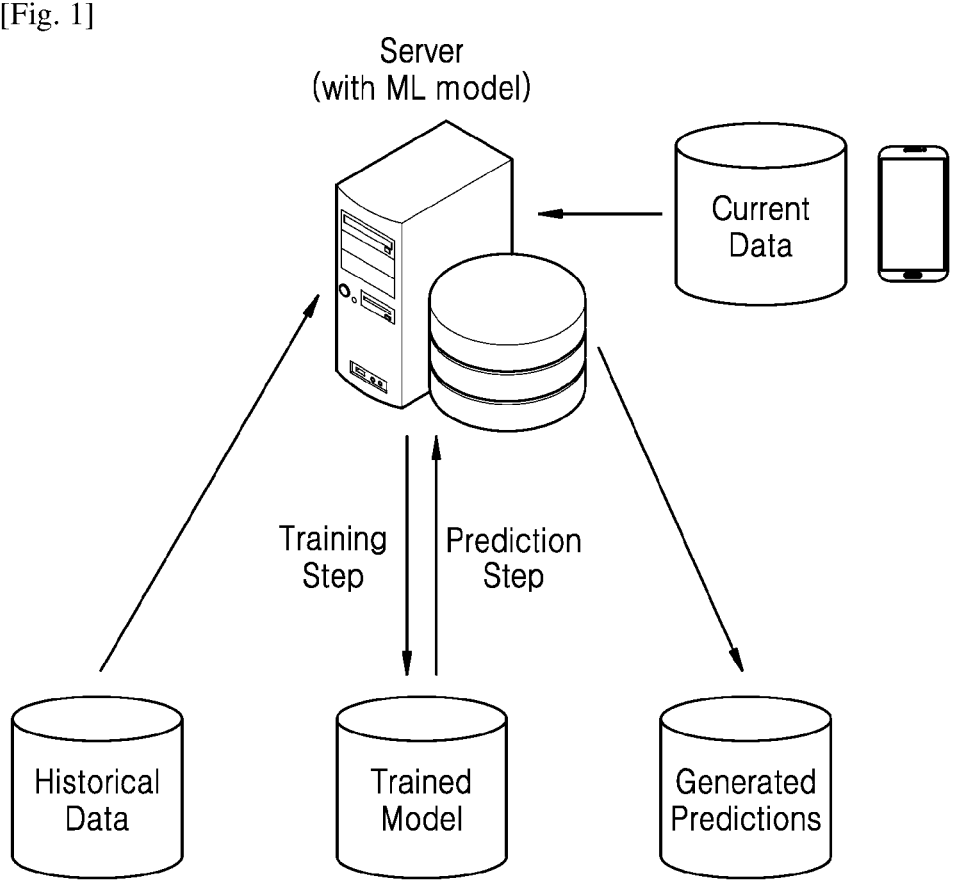

[Fig. 2]
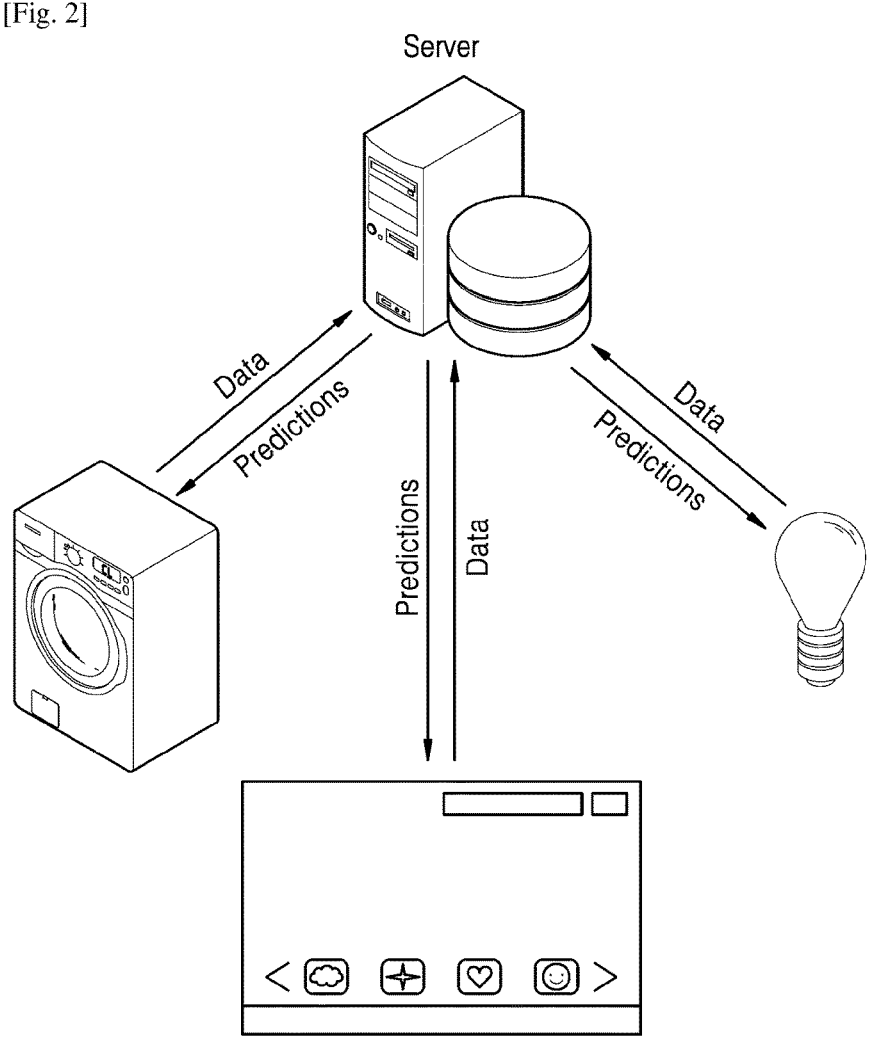
[Fig. 3]
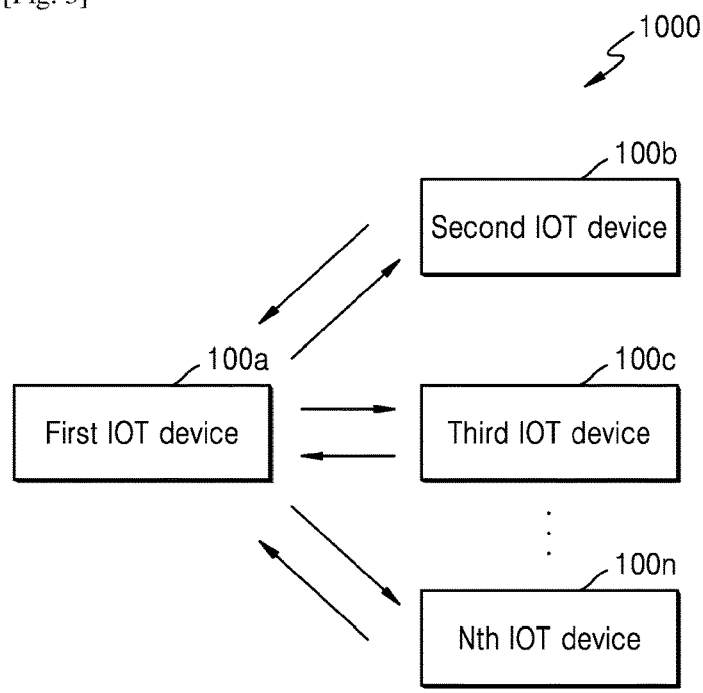

[Fig. 4a]
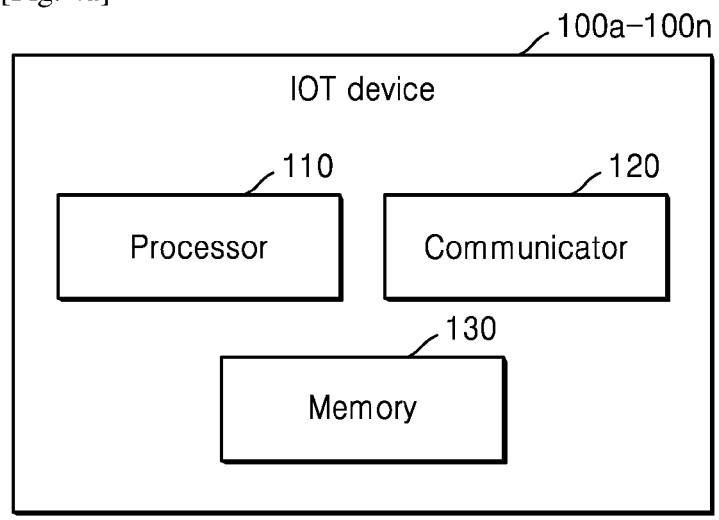
[Fig. 4b]
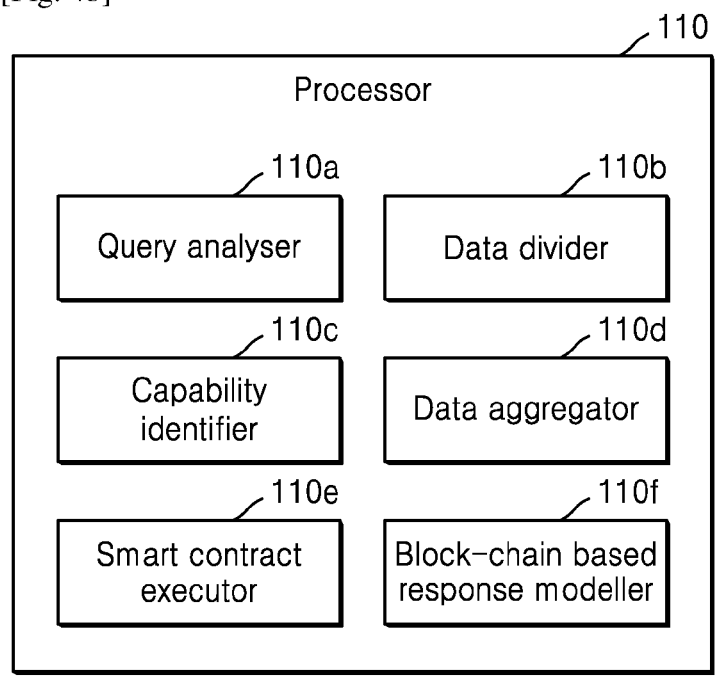

[Fig. 5a]
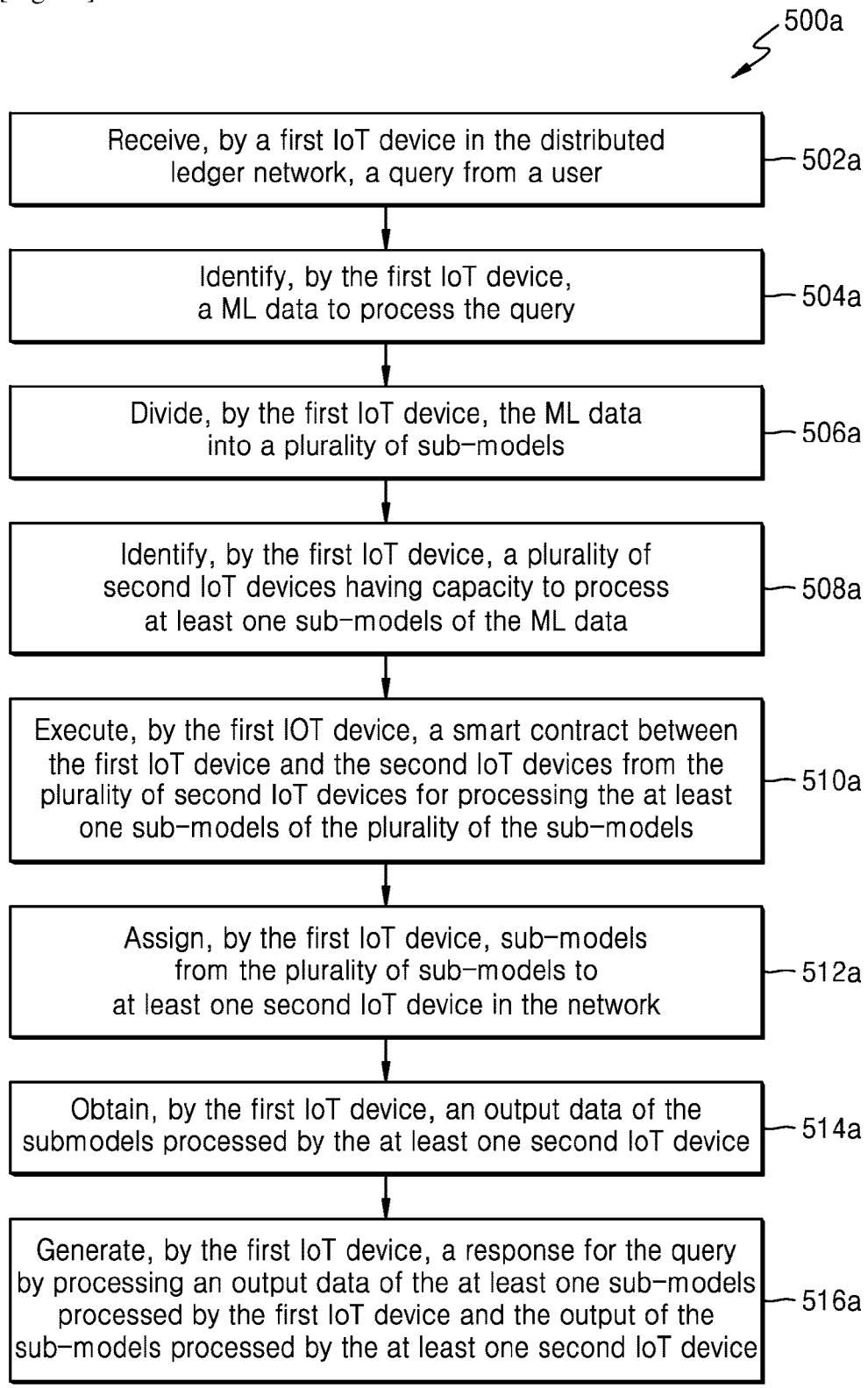

[Fig. 5b]
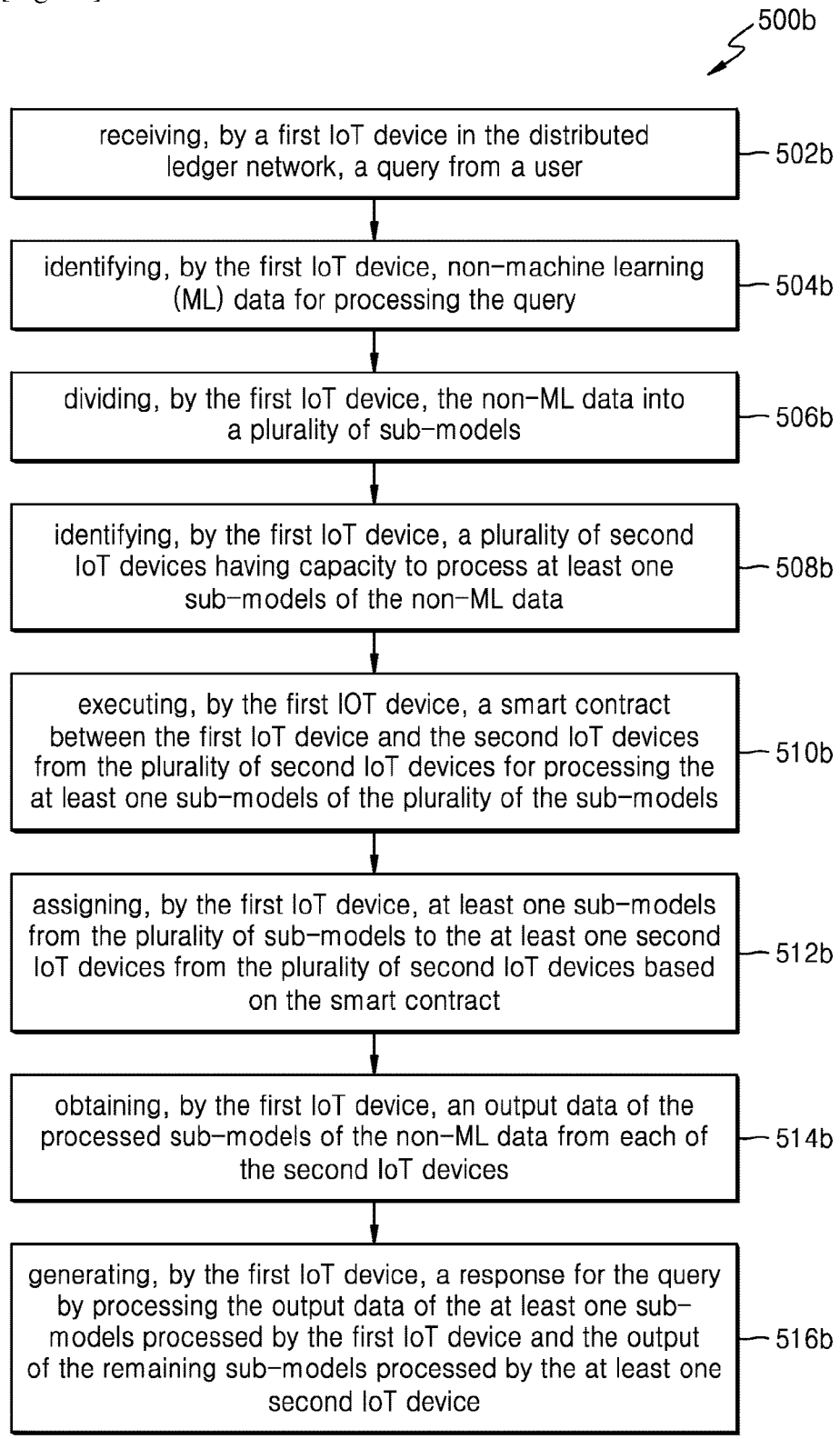

[Fig. 5c]
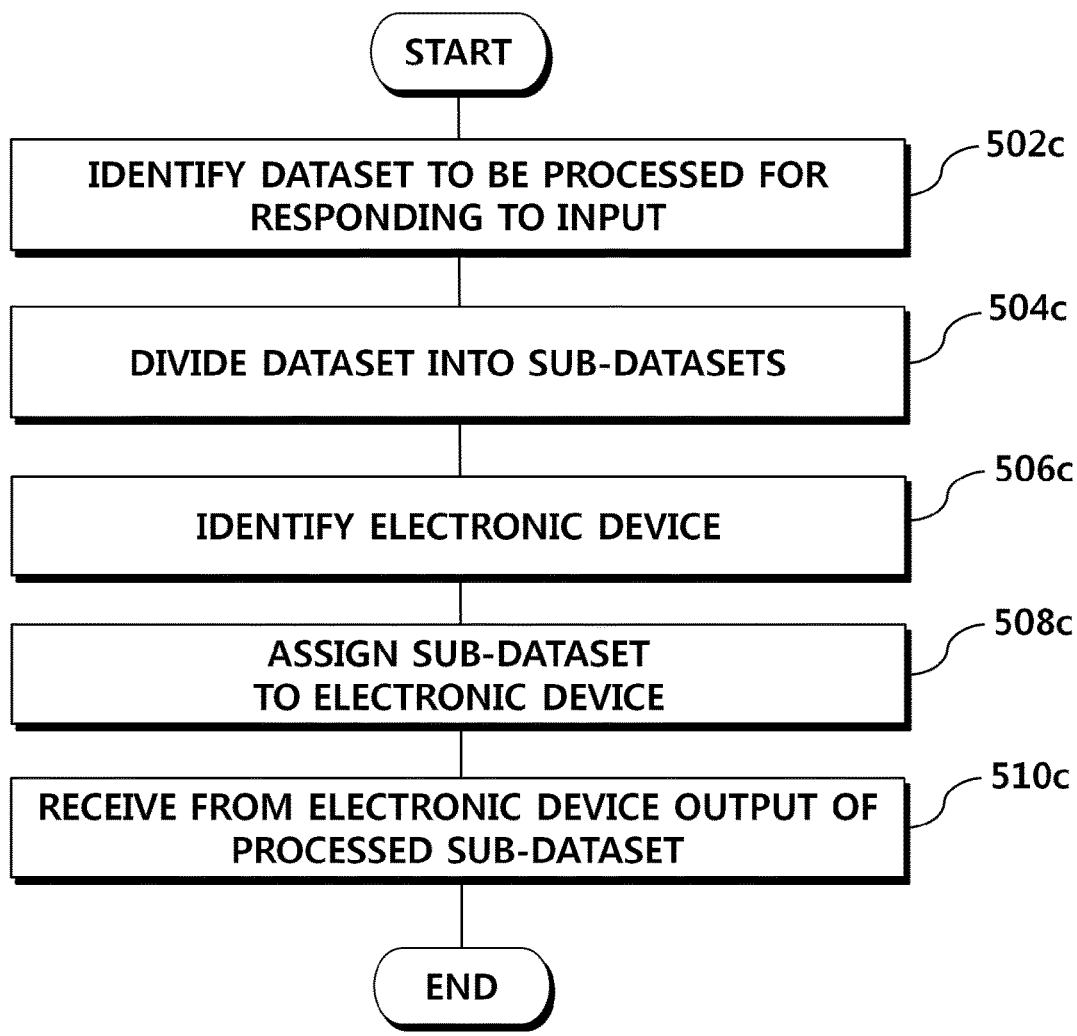

FIG. 6A

DEVICE LOGS
User 1, washing machine, Wednesday 7 am (morning), Colored, Regular, Warm.
User 2, washing machine, Wednesday 10 am (morning), Whites, Regular, Warm.
User 1, washing machine, Sunday 5 pm (evening), Delicates, Delicates, Cold.
User 2, washing machine, Wednesday 8 am (morning), Colored, Regular, Warm.

| Device Type | Device Profile Data |
|---|---|
| Washing Machine | Day of the week, Time, Type of fabric, Cycle, Water temperature |
| Fridge | Average Temperature, Time of Use, Duration, No. of times in a day door opened |
| Microwave | Use Frequency, Temperature Set, Average time of use |
| Lightbulb | Brightness / Luminescence |
| AC | Temperature setting |
| TV | Number of times used each day, what time of use, how long used |

Distributed Association Rule Mining
Support = Prob(X U Y)
Confidence = Prob(Y | X)

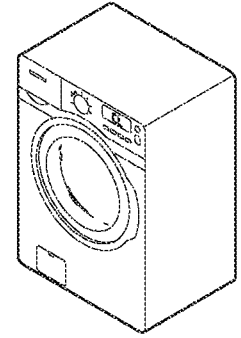

SMART WASHING MACHINE

ASSOCIATION RULES
(User 2, Washing machine, frequent time of day: morning, frequent days of week: Wednesday, Fabric Type: Whites/Colored, Cycle: Regular, temperature: Warm)
(User 1, Washing machine, frequent time of day: morning, frequent days of week: Wednesday, Sunday, Fabric Type: Colored, Cycle: Regular, temperature: Warm)

[Fig. 6b]
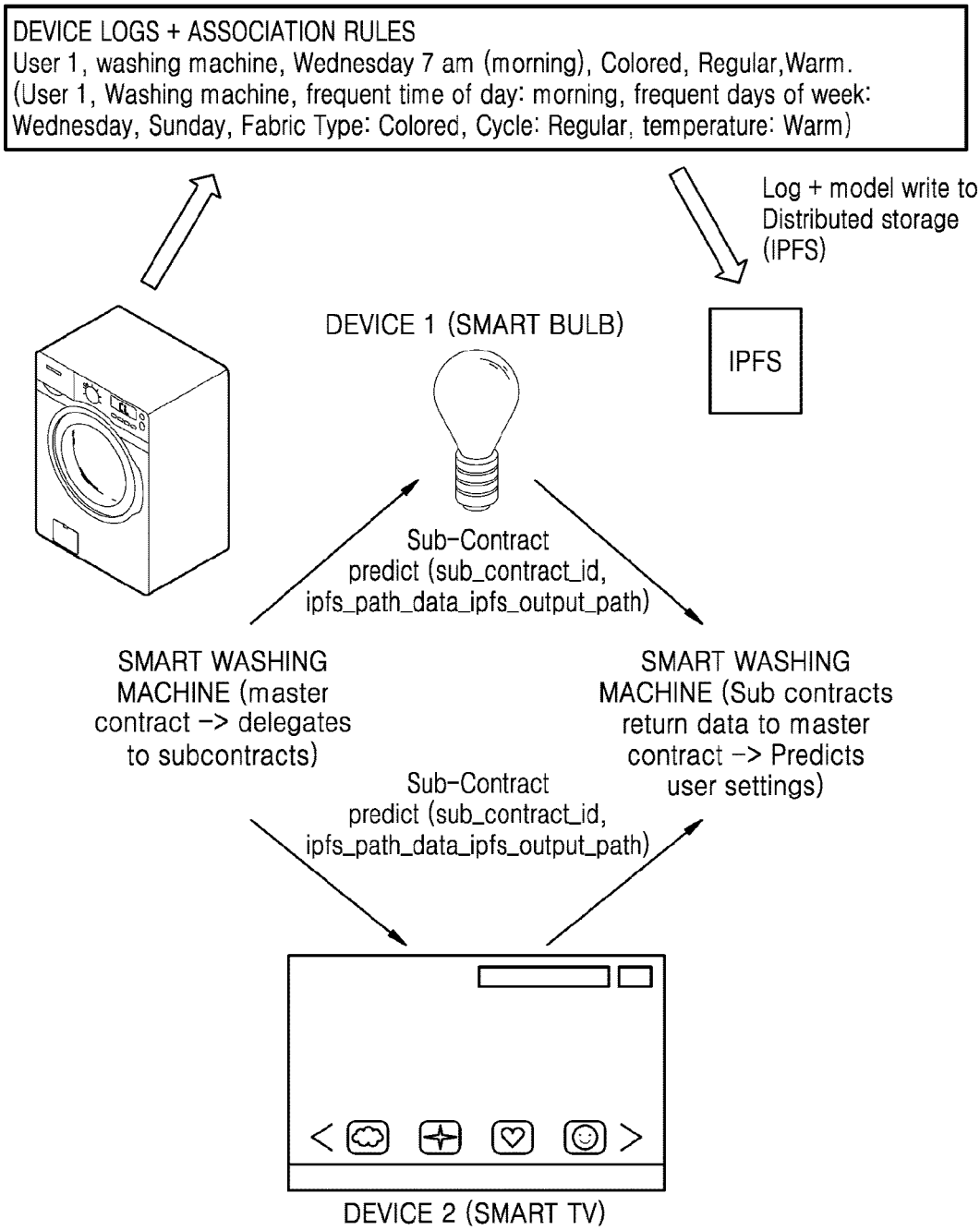

[Fig. 7]
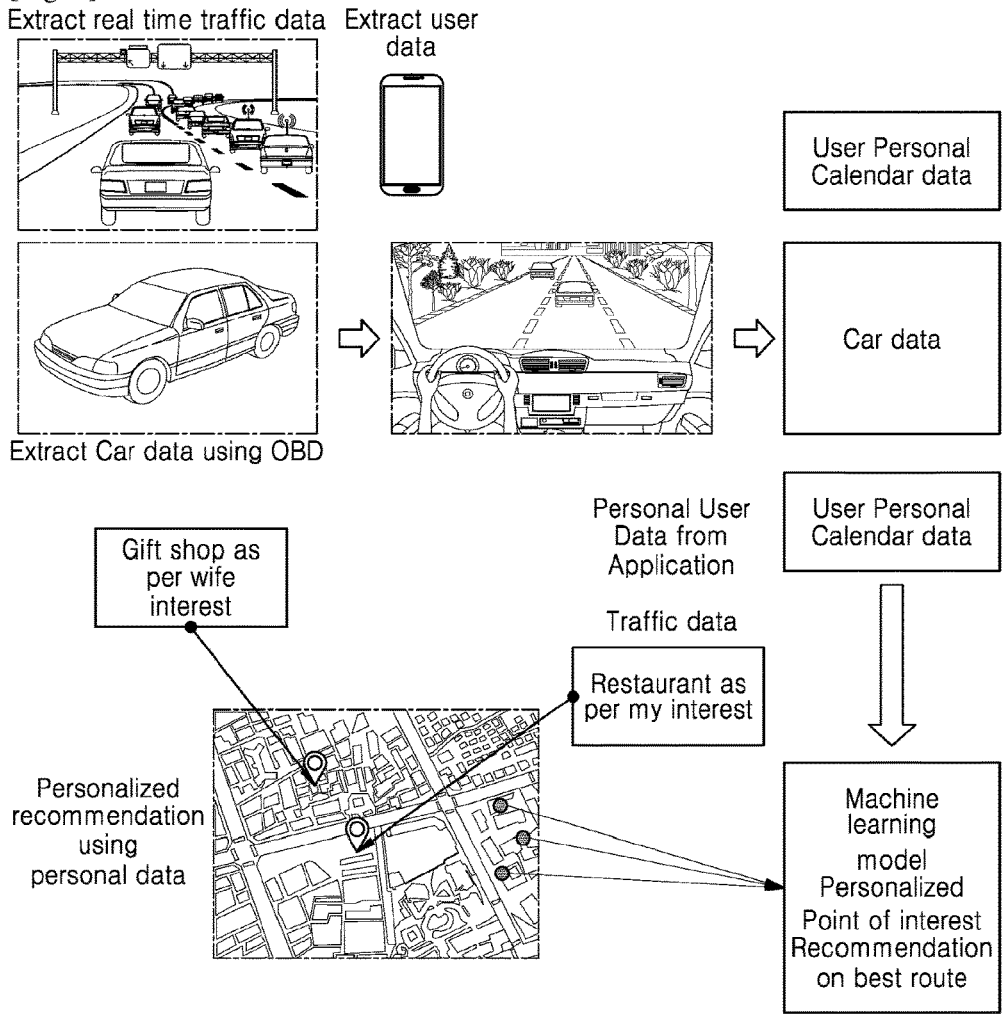
[Fig. 8]
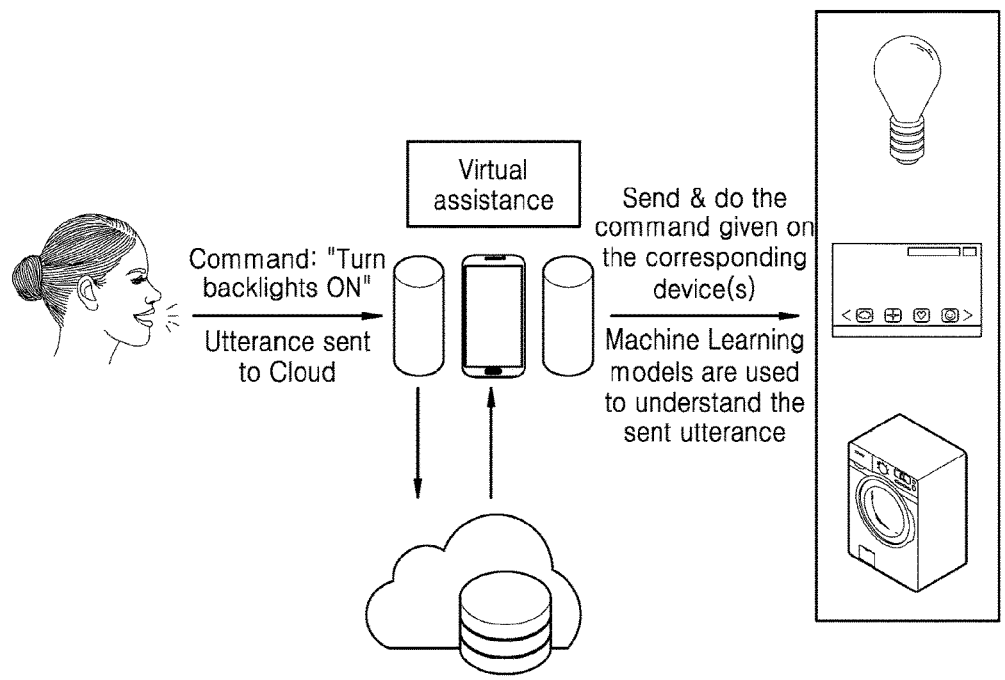

[Fig. 9]
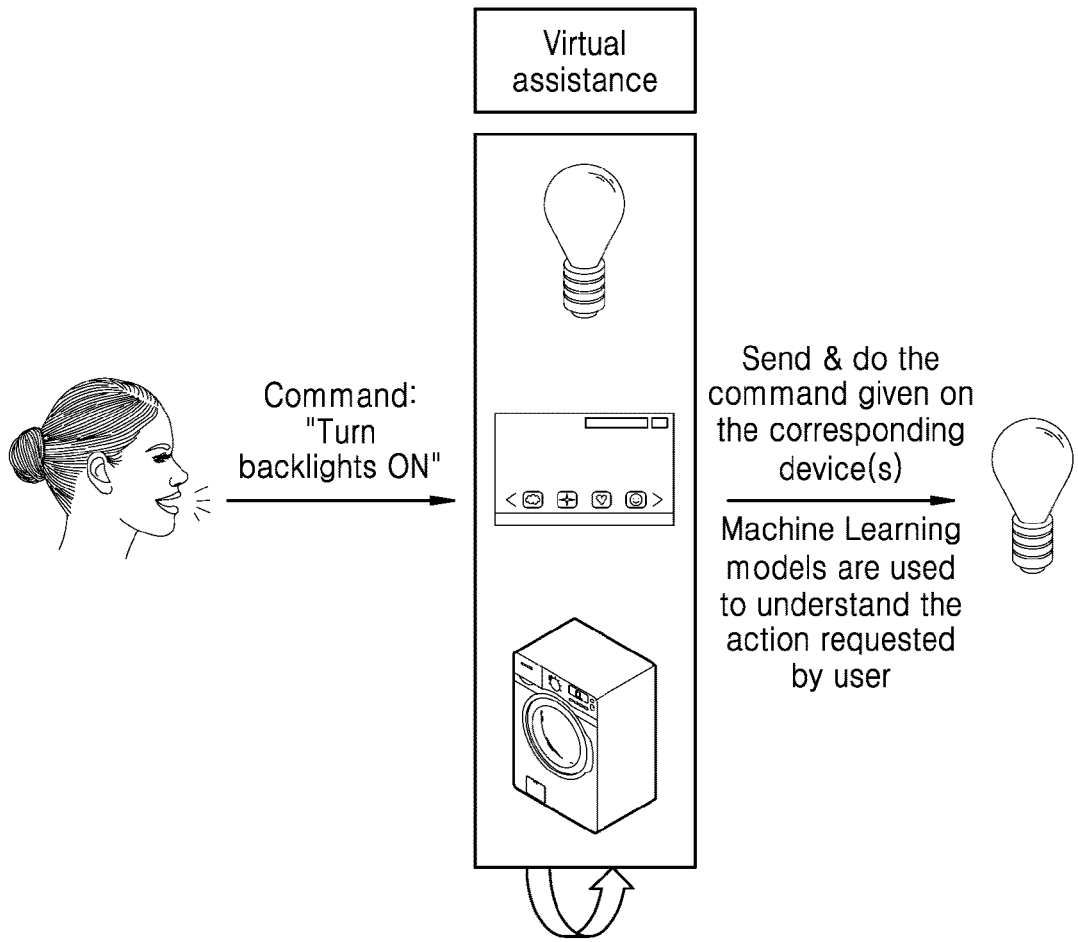
[Fig. 10]
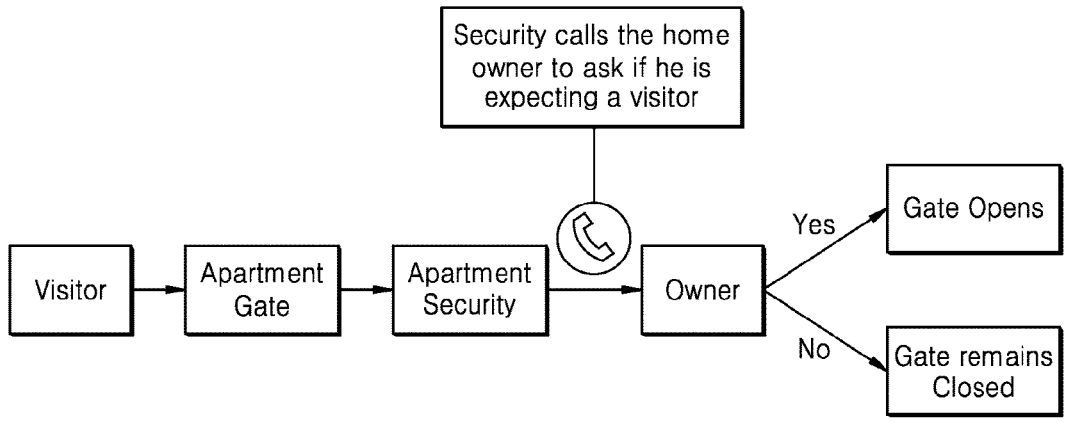

[Fig. 15]
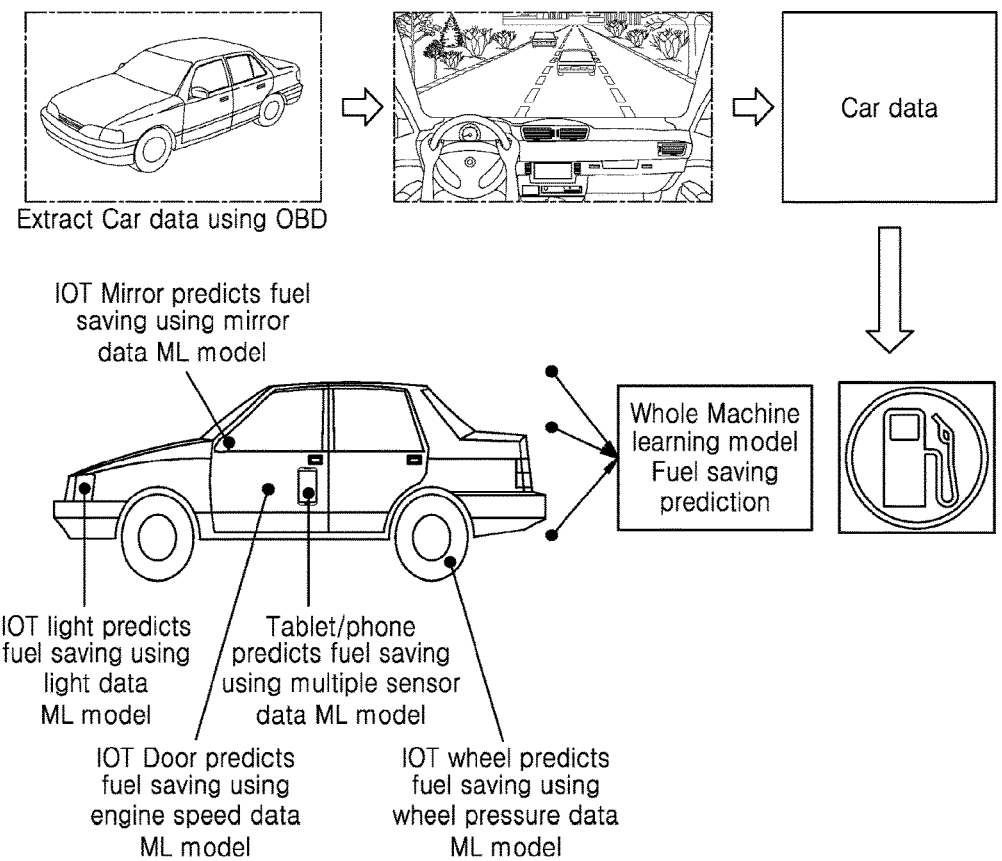
[Fig. 16]
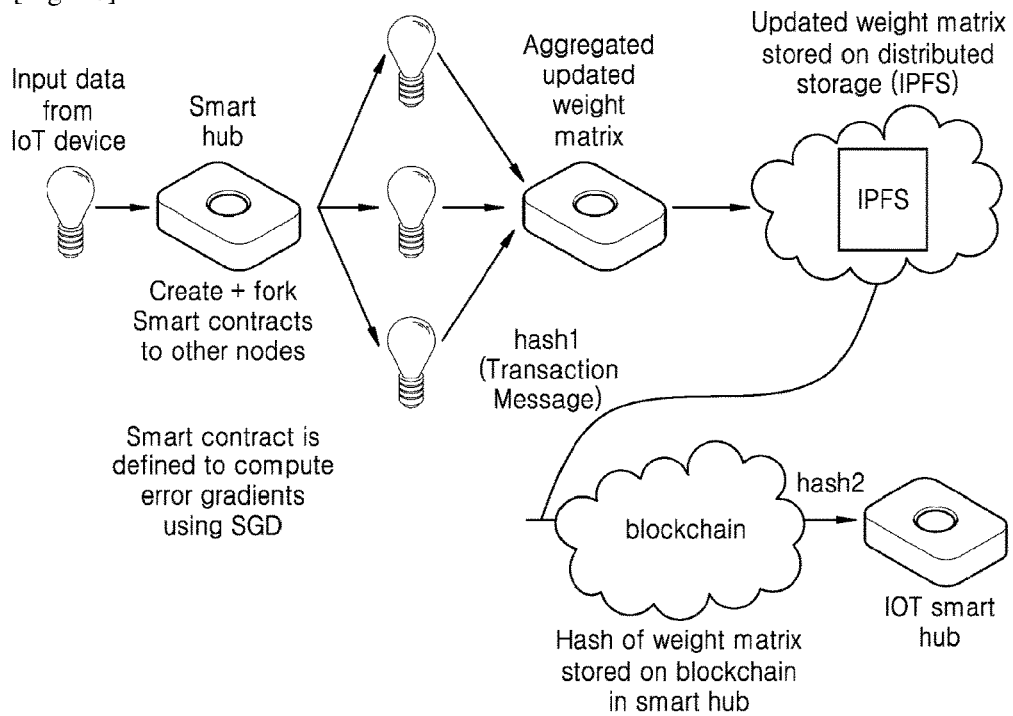
* SGD = Stochastic Gradient Descent
Weight update equation
$w(t+1) = w(t) + \lambda \sum_{i=1}^{k} \delta d_i / \delta w_i$
Where $\lambda$ = learning rate

[Fig. 17]
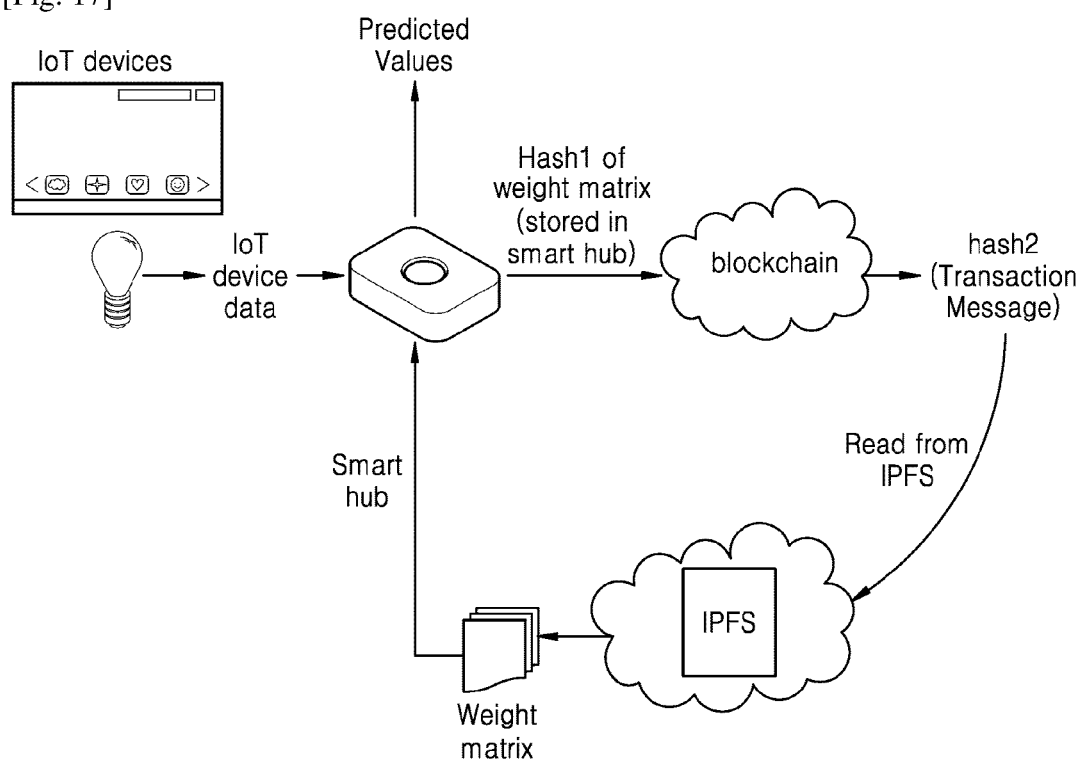

[Fig. 19]
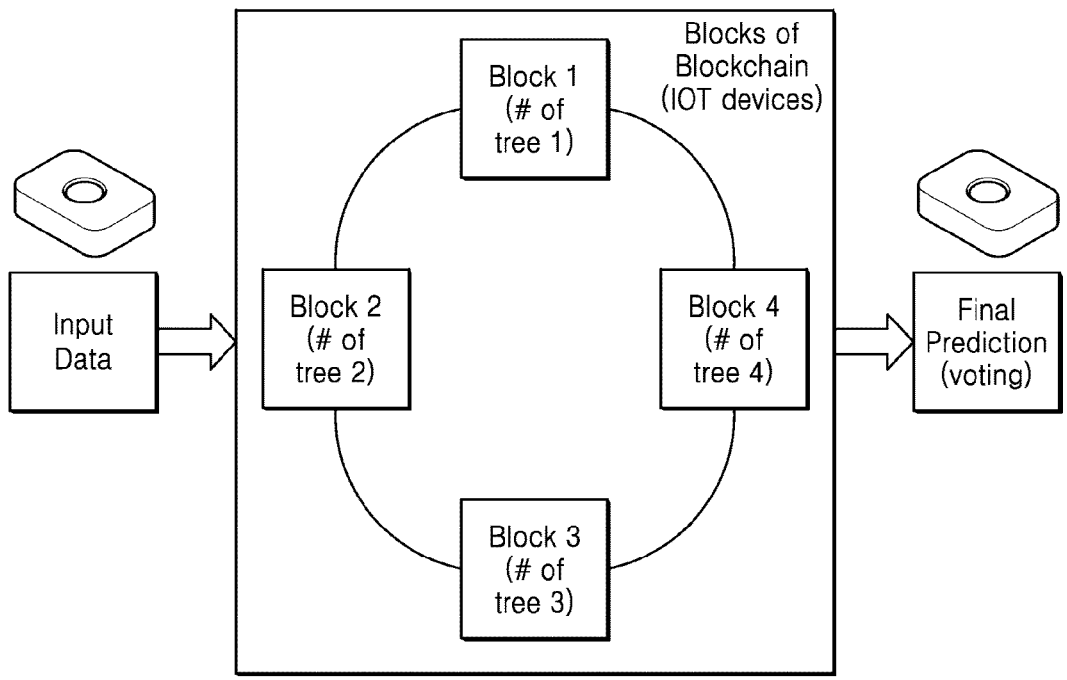
[Fig. 20]
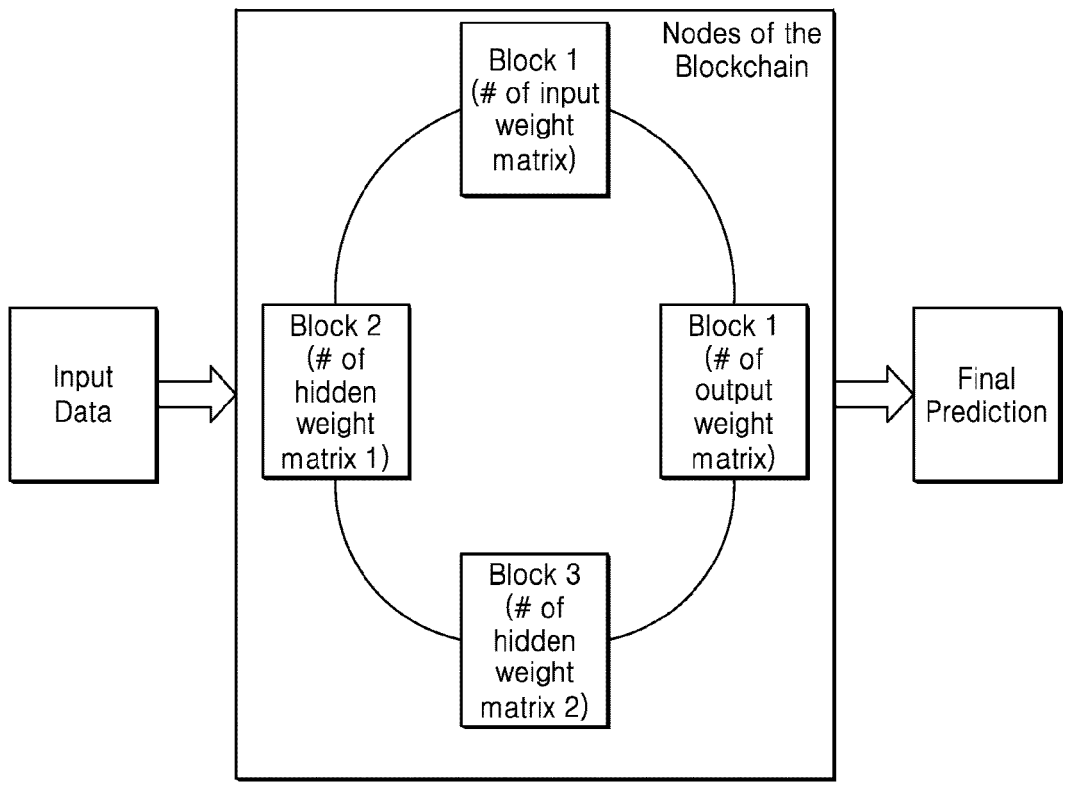

MACHINE LEARNING ON A BLOCKCHAIN

TECHNICAL FIELD

Embodiments herein relate to processing information, and more particularly to processing information for Internet of Things (IoT) devices by using a distributed ledger network.

BACKGROUND ART

In general, an IoT device generates streams of data that need to be processed to learn a user's behavioral patterns or routines by using a machine learning (ML) procedure. However, it is difficult to use the ML procedure on devices such as IoT sensors, because such sensors do not have enough memory and processing capability to run the ML procedure thereon. To work around this problem, data may be sent to a centralized server having an ML model as illustrated in FIGS. 1 and 2, but it is expensive to maintain the server, and may compromise the user's privacy. If the ML model is compressed to run on the IoT sensors, accuracy of prediction may decrease.

DISCLOSURE OF INVENTION

Solution to Problem

According to an embodiment, there is provided an electronic device comprising: a memory storing instructions; and at least one processor configured to execute the instructions to: in response to an input, identify a dataset to be processed for responding to the input; divide the dataset into a plurality of sub-datasets; identify at least one electronic device which processes at least one sub-dataset; assign the at least one sub-dataset to the at least one electronic device to process the at least one sub-dataset; and receive from the at least one electronic device at least one output of the processed at least one sub-dataset to generate a response to the input.

BRIEF DESCRIPTION OF DRAWINGS

The above and other advantages of embodiments will be better understood from the following description with reference to the accompanying drawings, in which:

FIG. 1 is a diagram for explaining a machine learning (ML) model with a centralized server;

FIG. 2 is a diagram illustrating communications between a server and IoT devices;

FIG. 3 is a schematic view illustrating IoT devices according to an embodiment;

FIG. 4a is a block diagram of an IoT device according to an embodiment;

FIG. 4b is a block diagram of a processor included in the IoT device according to an embodiment;

FIG. 5a is a flowchart illustrating a method of processing the ML data on the distributed ledger network according to an embodiment;

FIG. 5b is a flowchart illustrating a method of processing the ML data by using a smart contract according to an embodiment;

FIG. 5c is a flowchart illustrating a method according to an embodiment;

FIG. 6a is a diagram for explaining washing machine personalization according to an embodiment;

FIG. 6b is a diagram for explaining the use of a smart contract according to an embodiment;

FIG. 7 is a diagram for explaining a navigation system according to an embodiment;

FIG. 8 is a diagram for explaining a virtual assistance application using a server;

FIG. 9 is a diagram for explaining an example scenario of the virtual assistance application according to an embodiment;

FIG. 10 is a diagram for explaining a guest verification procedure;

FIG. 15 is a diagram for explaining smart fuel saving in a car according to an embodiment;

FIG. 16 is a diagram for explaining division of a machine learning model via forking according to an embodiment;

FIG. 17 is a diagram for explaining an ML prediction using a blockchain according to an embodiment;

FIG. 19 is a diagram for explaining a decision tree trained model working as a smart contract on a node in the blockchain according to an embodiment; and FIG. 20 is a diagram for explaining a deep neural network (DNN) on blockchain according to an embodiment.

BEST MODE FOR CARRYING OUT THE INVENTION

Figure 11:
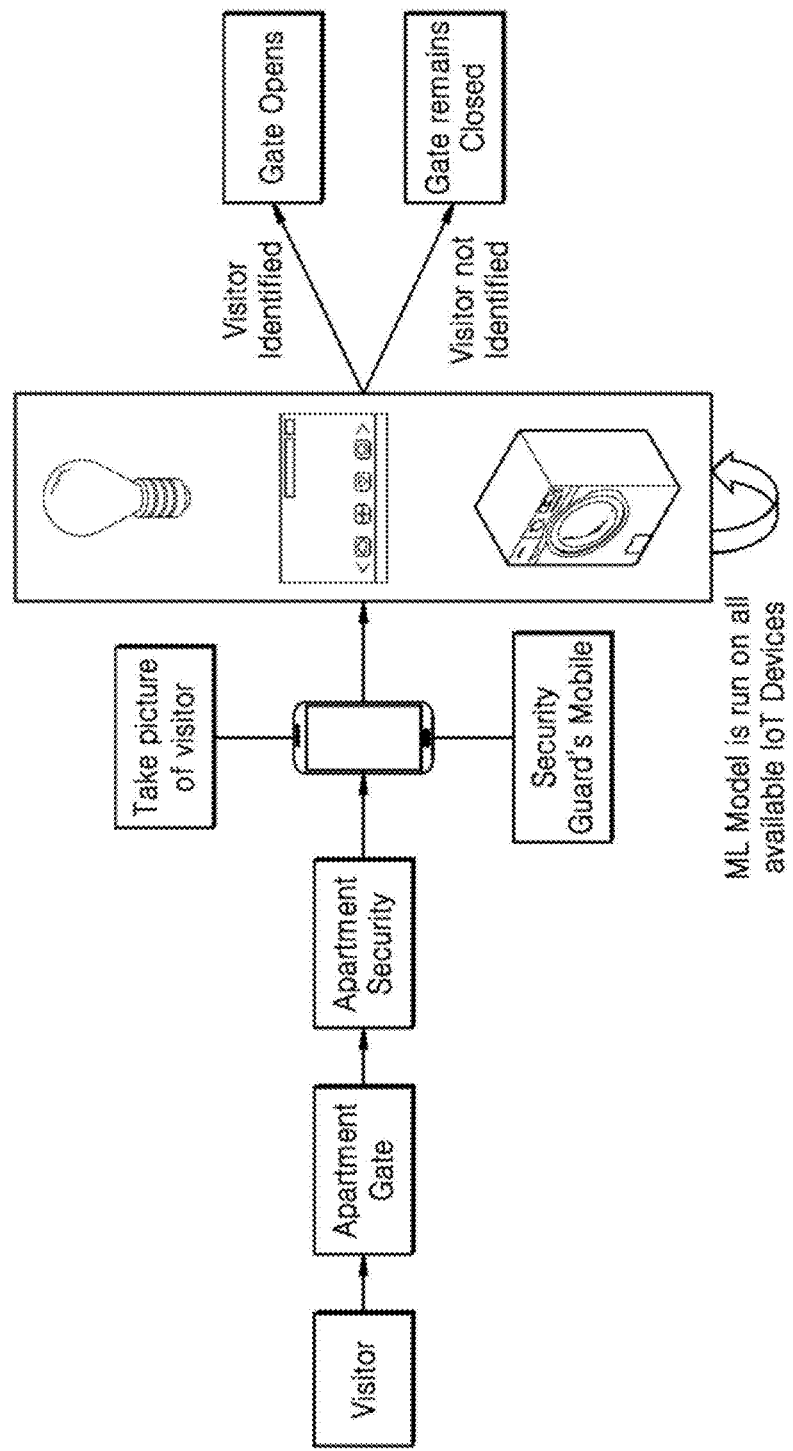
FIG. 11 is a diagram for explaining a guest verification procedure according to an embodiment.

Aspects of the disclosure are to address at least the above-mentioned problems and/or disadvantages and to provide at least the advantages described below.

According to an embodiment, there is provided an electronic device comprising: a memory storing instructions; and at least one processor configured to execute the instructions to: in response to an input, identify a dataset to be processed for responding to the input; divide the dataset into a plurality of sub-datasets; identify at least one electronic device which processes at least one sub-dataset; assign the at least one sub-dataset to the at least one electronic device to process the at least one sub-dataset; and receive from the at least one electronic device at least one output of the processed at least one sub-dataset to generate a response to the input.

According to an embodiment, there is provided an electronic device comprising: a memory storing instructions; and at least one processor configured to execute the instructions to: receive from another electronic device a sub-dataset divided from a dataset which is identified, at the other electronic device, for responding to an input; process the sub-dataset to produce an output; and transmit to the other electronic device the output of the processed sub-dataset to generate a response to the input.

According to an embodiment, there is provided a method comprising: in response to an input, identifying a dataset to be processed for responding to the input; dividing the data into a plurality of sub-datasets; identifying at least one electronic device which processes at least one sub-dataset; assigning the at least one sub-dataset to the at least one electronic device to process the at least one sub-dataset; and receiving from the at least one electronic device an output of the processed at least one sub-dataset to generate a response to the input.

According to an embodiment, there is provided a method comprising: receiving from another electronic device a sub-dataset divided from a dataset which is identified, at the other electronic device, for responding to an input; processing the sub-dataset to produce an output; and transmitting to the other electronic device the output of the processed sub-dataset to generate a response to the input.

According to an embodiment, there is provided a computer program comprising instructions which, when the computer program is executed by at least one processor, cause the at least one processor to carry out one of the above methods.

Accordingly, an embodiment provides a method for IoT devices to process data assistively in a distributed ledger network. The method includes receiving, by a first IoT device in the distributed ledger network, a query from a user. Further, the method includes identifying, by the first IoT device, the ML data to process the query. Further, the method includes dividing, by the first IoT device, the ML data into a plurality of sub-models. Further, the method includes identifying, by the first IoT device, a plurality of second IoT devices having capacity to process at least one sub-models of the ML data. Further, the method includes executing, by the first IoT device, a smart contract between the first IoT device and the second IoT devices from the plurality of second IoT devices for processing the at least one sub-models of the plurality of the sub-models. Further, the method includes assigning, by the first IoT device, at least one sub-models from the plurality of sub-models to at least one second IoT device in the blockchain-based IoT network based on the smart contract. Further, the method includes obtaining, by the first IoT device, an output data of the remaining sub-models of the ML data from each of the second IoT devices. Further, the method includes generating, by the first IoT device, a response for the query by processing an output data of the at least one sub-models processed by the first IoT device and the output of the remaining sub-models processed by the at least one second IoT device.

In an embodiment, assigning the remaining sub-models to the at least one second IoT device in the blockchain-based IoT network includes identifying the at least one second IoT device for processing the remaining sub-models based on at least one of capacity, a neighbor IoT device of the first IoT device, and a priority set by a user, executing at least one smart contract between the first IoT device and the at least one identified second IoT devices for processing the remaining sub-models, and assigning the remaining sub-models to the at least one second IoT device for processing the remaining sub-models.

In an embodiment, generating the response for the query by processing the output data of the at least one sub-model processed by the first IoT device and the output of the remaining sub-models processed by the at least one second IoT device includes aggregating each of the output data of the at least one sub-models processed by the at least one second IoT device and the output of the at least one sub-model processed by the first IoT device to generate a trained machine learning model, and generating the response for the query by applying the trained machine learning model on the query.

In an embodiment, the output data of the first IoT device and the at least one second IoT device added as individual blocks in the distributed ledger network.

In an embodiment, the at least one second IoT device processes the remaining sub-models according to terms and specifications of at least one smart contract.

In an embodiment, the first IoT device links at least one smart contract to a blockchain infrastructure, where a private ledger and a public ledger of the blockchain infrastructure are used to verify the processing of the sub-models on the at least one second IoT device according to the smart contract.

In an embodiment, identifying, by the first IoT device, the plurality of second IoT devices having capacity to process at least one sub-models of the ML data comprises detecting, by the first IoT device, a user presence in the distributed ledger network, obtaining, by the first IoT device, a profile of the user, and identifying, by the first IoT device, the plurality of second IoT devices having capacity to process at least one sub-models of the ML data based on the profile.

In an embodiment, identifying, by the first IoT device, the plurality of second IoT devices having capacity to process at least one sub-models of the sub-models comprises detecting, by the first IoT device, context associated with the ML data in the distributed ledger network, and identifying, by the first IoT device, the plurality of second IoT devices having capacity to process at least one sub-models of the ML data based on the context.

In an embodiment, identifying, by the first IoT device, the plurality of second IoT devices having capacity to process at least one sub-models of the ML data comprises detecting, by the first IoT device, at least two user's presence in the distributed ledger network, determining, by the first IoT device, a conflict to identify the plurality of second IoT devices having capacity to process at least one sub-models of the ML data in response at least two users presence in the distributed ledger network, and identifying, by the first IoT device, the plurality of second IoT devices having capacity to process at least one sub-models of the ML data based on a setting.

In an embodiment, the setting comprises at least one of a First come first serve (FCFS) setting, a Last come first serve (LCFS), and a voting based setting.

In an embodiment, the trained machine learning model is generated by receiving the query from the first IoT device, selecting the at least one second IoT device from the plurality of IoT devices to process the received query based on capability of each of the IoT devices, dividing the query into a label data and a non-label data, identifying at least one of second IoT devices to process the label data and the non-label data, and aggregating each divided data result to generate the trained machine learning model.

Accordingly, the embodiment herein provides a method for IoT devices to process data assistively in a distributed ledger network. The method includes receiving, by a first IoT device in the distributed ledger network, a query from a user. Further, the method includes identifying, by the first IoT device, non-machine learning (ML) data for processing the query. Further, the method includes dividing, by the first IoT device, the non-ML data into a plurality of sub-models. Further, the method includes identifying, by the first IoT device, a plurality of second IoT devices having capacity to process at least one sub-models of the non-ML data. Further, the method includes executing, by the first IoT device, a smart contract between the first IoT device and the second IoT devices from the plurality of second IoT devices for processing the at least one sub-models of the plurality of the sub-models. Further, the method includes assigning, by the first IoT device, at least one sub-models from the plurality of sub-models to the at least one second IoT devices from the plurality of second IoT devices based on the smart contract.

Further, the method includes obtaining, by the first IoT device, an output data of the processed sub-models of the non-ML data from each of the second IoT devices. Further, the method includes generating, by the first IoT device, a response for the query by processing the output data of the at least one sub-models processed by the first IoT device and the output of the remaining sub-models processed by the at least one second IoT device.

In an embodiment, identifying, by the first IoT device, the plurality of second IoT devices having capacity to process at least one sub-models of the non-ML data comprises detecting, by the first IoT device, a user presence in the distributed ledger network, obtaining, by the first IoT device, a profile of the user, and identifying, by the first IoT device, the plurality of second IoT devices having capacity to process at least one sub-models of the non-ML data based on the profile.

In an embodiment, identifying, by the first IoT device, the plurality of second IoT devices having capacity to process at least one sub-models of the sub-models comprises detecting, by the first IoT device, context associated with the non-ML data in the distributed ledger network, and identifying, by the first IoT device, the plurality of second IoT devices having capacity to process at least one sub-models of the non-ML data based on the context.

In an embodiment, identifying, by the first IoT device, the plurality of second IoT devices having capacity to process at least one sub-models of the non-ML data comprises detecting, by the first IoT device, at least two user's presence in the distributed ledger network, determining, by the first IoT device, a conflict to identify the plurality of second IoT devices having capacity to process at least one sub-models of the non-ML data in response at least two users presence in the distributed ledger network, and identifying, by the first IoT device, the plurality of second IoT devices having capacity to process at least one sub-models of the non-ML data based on a setting.

In an embodiment, the trained machine learning model is generated by receiving the query from the first IoT device, selecting the at least one second IoT device from the plurality of IoT devices to process the received query based on capability of each of the IoT devices, dividing the query into a label data and a non-label data, identifying at least one of second IoT devices to process the label data and the non-label data, and aggregating each divided data result to generate the trained machine learning model.

Accordingly, the embodiment herein provides an IoT device for processing data assitively in a distributed ledger network. The IoT device includes a processor coupled to a memory. The processor may receive a query from a user and determine a ML data to process the query. Further, the processor may divide the ML data into a plurality of sub-models. Further, the processor may identify a plurality of second IoT devices having capacity to process at least one sub-models of the ML data. Further, the processor may execute a smart contract between the first IoT device and the second IoT devices from the plurality of second IoT devices for processing the at least one sub-models of the plurality of the sub-models. Further, the processor may assign remaining sub-models from the plurality of sub-models to at least one another IoT device in the blockchain-based IoT network and obtain an output data of the remaining sub-models processed by the at least one another IoT device. Further, the processor may generate a response for the query by processing an output data of the at least one sub-models processed by the processor included in the IoT device and the output of the sub-models processed by the at least one another IoT device.

Accordingly, the embodiment herein provides a first IoT device for processing data assistively in a distributed ledger network. The first IoT device comprises a processor coupled with a memory. The processor may receive a query from a user and identify non-machine learning (ML) data for processing the query. The processor may divide the non-ML data into a plurality of sub-models. The processor may identify a plurality of second IoT devices having capacity to process at least one sub-models of the non-ML data. The processor may execute a smart contract between the first IoT device and the second IoT devices from the plurality of second IoT devices for processing the at least one sub-models of the plurality of the sub-models. The processor may assign at least one sub-models from the plurality of sub-models to the at least one second IoT devices from the plurality of second IoT devices based on the smart contract. The processor may obtain an output data of the processed sub-models of the non-ML data from each of the second IoT devices. The processor may generate a response for the query by processing the output data of the at least one sub-models processed by the first IoT device and the output of the remaining sub-models processed by the at least one second IoT device.

MODE FOR THE INVENTION

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

Accordingly, embodiments disclose a method for processing data on. The data may include ML data and non-ML data. The data may be processed in a distributed ledger network. The method may include receiving, by a first device in the distributed ledger network, a query from a user. The first device may be a first IoT device. Further, the method may include determining, by the first IoT device, data (e.g., ML data) to process the query. Further, the method may include dividing, by the first IoT device, the ML data into a plurality of sub-models. The sub-models may be ML sub-models. Further, the method may include identifying, by the first IoT device, a plurality of second devices having capacity to process at least one sub-models of the ML data. The second devices may be second IoT devices. Further, the method may include executing, by the first IoT device, a smart contract between the first IoT device and the second IoT devices from the plurality of second IoT devices for processing the at least one sub-models of the plurality of the sub-models. Further, the method may include assigning, by the first IoT device, sub-models from the plurality of sub-models to at least one second IoT device in the blockchain-based IoT network. The sub-models assigned to the at least one second IoT device may be ones remained after assigning at least one sub-model to the first IoT device. Further, the method may include obtaining, by the first IoT device, an output data of the sub-models processed by the at least one second IoT device. Further, the method may include generating, by the first IoT device, a response for the query by processing an output data of the at least one sub-model processed by the first IoT device and the output of the sub-models processed by the at least one second IoT device.

According to an embodiment, each IoT device may automatically divide the ML model into smaller parts to send the divided parts to surrounding IoT devices for computation as per their capabilities, and merge results of the computations. The division of the ML model may be performed by forking of smart contracts. Distributed and secure Blockchain storage may be used to store the ML model and the results of the computation. This results in processing the ML data on the distributed ledger network in a cost effective, secure and accurate manner.

According to an embodiment, a secure system for personalization of the IoT devices in a smart home may be provided to a user based on using the blockchain. The distributed ledger network may store the device profiles of individual users in the shared household. According to an embodiment, automatic personalization of each device may be accomplished in response to detecting a particular user entering the room where the device is located, in a secure and cost effective manner. In an example, when first user has a preferred brightness or luminescence value for a smart bulb, and the first user enters a room, then the smart bulb may detect the first user presence in the home, obtain the first user's luminescence setting preference from the blockchain, and automatically set its brightness value based on the first user's luminescence setting. When a different user (i.e., second user) is detected in the same room prior to the first user, then an appropriate conflict resolution strategy such as computing the average or First Come First Serve (FCFS) may be applied.

FIG. 3 is a schematic view illustrating IoT devices according to an embodiment. IoT devices may process data based on their capability.

The distributed ledger network 1000 includes a first IoT device 100*a* and a set of IoT devices 100*b*-100*n*. The first IoT device 100*a* may communicate with the set of IoT devices 100*b*-100*n*. The IoT devices 100*a*-100*n* may be, for example but not limited to a smart TV, a smart bulb, a smart phone, a smart Air conditioner (AC), a smart fridge, a door sensor or the like. The IoT devices 100*a*-100*n* may communicate with each other. The IoT devices 100*a*-100*n* may be in the same home network, but is not limited thereto. The distributed ledger network may be, for example, but not limited to a blockchain-based Internet of Things (IoT) network, a graph-based distributed ledger system such as the IOTA (based on Tangle), Hashgraph (based on gossip protocol) or the like.

In an embodiment, the first IoT device 100*a* may receive a query of a user and determine a ML data or non-ML to process the query. The query of the user may be received from the user's personal device. The ML data may include components of a core machine learning model, for example weights learnt by the model/procedure. The ML Data may not be provided to the user externally but generated in the procedure of running its core logic. Data other than the ML Data may be referred to as non-ML data. The non-ML Data may be, for example, input data like device logs, images, text, etc. The non-ML data may be given as inputs for the machine learning model, e.g., an image having a cat/dog, an image not having a cat/dog, the labels 'cat'/'dog' along with the images may be categorized into the non-ML data.

In an example, the weights and hyperparameters may be learnt by processing the Decision Trees, Random Forests, Neural Network, etc The non-ML Data may be fed as inputs for the ML Model (even labels for ML task may fall under the Non-ML data). The non-ML data may include images, text, news articles, app category, app metadata, and app usage data, but is not limited thereto. Further, the first IoT device 100a may divide the ML data/non-ML data into a plurality of sub-models. The ML data may include a ML model or components of the ML model. Further, the first IoT device 100a may identify a plurality of IoT devices 100b-100n. The first IoT device 100a may identify the plurality of IoT devices 100b-100n based on capacity of the plurality of IoT devices 100b-100n to process at least one sub-models of the ML data/non-ML data. Further, the first IoT device 100a may generate a smart contract between the first IoT device 100a and the second IoT device 100b from the plurality of IoT devices 100b-100n for processing the at least one sub-models of the plurality of the sub-models. The smart contract may be executed.

Further, the first IoT device 100a may assign sub-models from the plurality of sub-models to at least one of the IoT devices 100b-100n. The sub-models assigned to the at least one IoT device may be ones remained after assigning at least one sub-model to the first IoT device. The assignment may be performed based on the smart contract between the first IoT device 100a and the IoT devices 100b-100n. The first IoT device 100a may obtain an output data of the sub-models processed by the at least one of the IoT devices 100b-100n. Further, the first IoT device 100a may generate a response to the query by processing an output data of the at least one sub-models processed by the IoT device 100a and the output of the sub-models processed by the at least one of the IoT devices 100b-100n.

In an embodiment, the first IoT device 100a may assign the sub-models to the at least one of the IoT devices 100b-100n in the distributed ledger network by identifying the at least one of the IoT devices 100b-100n based on capacity of the IoT devices 100b-100n. In an embodiment, the at least one of the IoT devices 100b-100n may be identified based on a neighbor IoT device 100b-100n of the IoT device 100a. In an embodiment, the at least one of the IoT devices 100b-100n may be identified based on a priority set by a user. In an embodiment, at least one smart contract between the IoT device 100a and the identified at least one of the IoT devices 100b-100n may be executed for processing the sub-models.

In an embodiment, the first IoT device 100a may aggregate each output of the sub-models processed by the at least one of the IoT devices 100b-100n and the output of the at least one sub-model processed by the IoT device 100a to generate a trained machine learning model. The trained ML model may be used to generate the response to the query of the user.

In an embodiment, the trained machine learning model may be generated by receiving the query from the first IoT device 100a, identifying the at least one IoT device from the plurality of IoT devices 100b-100n to process the received query based on capability of each of the IoT devices, dividing the query into a label data and a non-label data, causing the at least one IoT device to process the label data and the non-label data, and aggregating each output from each divided data.

The labelled data may include a set of input data that is mapped to one or more labels. For example, when predicting whether an image has dog or cat or both, each image may be labelled with 'dog', 'cat', 'none' or 'both'.

The unlabeled data may include a set of input data which is not mapped to one or more labels. In order to find out similar devices in a smart home environment without explicitly labeling each device, an ML models may be built to find similar devices based on users' usage of each device, which may be helpful to replace a device with another one. In this case, "labels" for a device, for example, 'refrigerator', is not provided, but a corresponding device may be found by the ML models based on the users' usage of devices.

Further, the first IoT device 100a may generate the response for the query by processing the output data of the at least one sub-model processed by the IoT device 100a and the output of the sub-models processed by the at least one of IoT devices 100b-100n.

In an embodiment, the output data of the IoT device 100a and the at least one of the IoT devices 100b-100n may be added as individual blocks in the distributed ledger network. In an embodiment, the at least one of the IoT devices 100b-100n may process the sub-models according to terms and specifications of at least one smart contract between the first IoT device 100a and the at least one of the IoT devices 100b-100n.

In an embodiment, the IoT device 100a may link the at least one smart contract to a blockchain infrastructure, and a private ledger or a public ledger of the blockchain infrastructure may be used to verify the processing of the sub-models on the at least one of the IoT devices 100b-100n according to the smart contract.

1. In an embodiment, the IoT device 100a may identify the plurality of IoT devices 100b-100n to process at least one sub-models of the ML data or non-ML data based on detecting a user. The user may be detected in the distributed ledger network 1000. A profile of the user may be used to identify the plurality of IoT devices 100b-100n to process at least one sub-models of the ML data or non-ML data.

In an embodiment, the IoT device 100a may identify the plurality of IoT devices 100b-100n to process at least one sub-models of the ML data or non-ML data based on detecting context associated with the ML data or non-ML in the distributed ledger network 100.

In an embodiment the first IoT device 100a may identify the plurality of IoT devices 100b-100n to process at least one sub-models of the ML data or non-ML data based on a setting when at least two users are detected. The at least two users may be detected in the distributed ledger network 1000. The first IoT device 100a, In an embodiment, the setting may include at least one of a first come first serve (FCFS) setting, a last come first serve (LCFS), and a voting based setting.

In an embodiment, the first IoT device 100a may store a user data on a blockchain with an Interplanetary file system (IPFS), and the ML models may be stored on the blockchain with IPFS. The IPFS may be implemented on multiple IoT devices 100a-100n consisting of the blockchain. The IPFS may be treated as one distributed file system used in the blockchain. The hash of the address of the IPFS file may be stored on the blockchain's of the IoT devices 100a-100n. The machine learning procedure of prediction/training (implemented by blockchain smart contracts) may be divided into sub-procedures, and distributed to nearby devices, results of the ML procedures may be aggregated. The sub-procedures may be referred to as subcontracts.

In an example, the blockchain may be a public blockchain system (e.g., Ethereum or the like). The blockchain may store the data in the IPFS. In another example, the blockchain may be a private blockchain system and the blockchain may store the data in an IoT hub or IoT devices on a network.

Using Ethereum: In an example, the first step may be computing the IoT device profile on the smart hub for each user and each device. The device profile may be updated periodically, for example monthly. The user preferences may be assumed to change not too often. The IoT devices 100a-100n may send the usage data to the IoT hub which analyses the data and computes the device profile. An example of the IoT hub may be SmartThings, but is not limited thereto. The person ordinary skill in the art, they may use other tool (e.g., Truffle, Ganache, or the like) to perform the same operation.

The computed profile may be stored on the blockchain using the IPFS, which in turns generates a hash. This generated hash may be stored on the Ethereum network. The transaction hash may be stored securely on the IoT hub.

2. Using the private blockchain system and store data in the hub: In another example, a block mining calculation (with a reduced difficulty level) may be performed in the IoT hub (e.g., SmartThings) consisting of an IoT environment, rather than in a remote server. In this architecture, the IoT hub may compute the device profiles and store them in a private blockchain system. According to an embodiment, protection of privacy may be strengthened, because the preferences of the users for different device settings are not stored on any external server, and the preferences of the users are stored on the IoT hub.

Using IOTA: In another example, the IOTA may be used. Using IOTA, each IoT device 100a-100n or the IoT hub may function as parts of the blockchain itself, and may have the capability of mining data. Each device computes and stores its own user device profile for each of the users, rather than store the profiles for all the IoT devices 100a-100n in the smart house.

The IOTA has a distributed ledger based on Tangle, which consists of nodes connected in a web form instead of blockchain. The Tangle uses a Directed Acyclic Graph (DAG) for storing transactions. Any transaction is verified by two other closer nodes in the web, unlike blockchain where only miners verify the transaction. In Tangle, the transaction may be confirmed when the transaction acquires enough cumulative weight. Thus, technological resources may be shared locally in real time between IoT devices in a distributed network. The verification of transactions may be completed by the nearest nodes. The IOTA utilizes a hash function called Curl, which is quantum-immune. IOTA may be used to trade exact amounts of resources on demand as well as store data from sensor and data loggers securely after verification.

FIG. 4a is a block diagram of an IoT device according to an embodiment, and FIG. 4b is a block diagram of a processor included in the IoT device according to an embodiment. In an embodiment, the IoT device 100 includes a processor 110, a communicator 120, and a memory 130. The processor 110 may receive the query from the user and determine the ML data to process the query. Further, the processor 110 may divide the ML data into the plurality of sub-models and process at least one sub-model from the plurality of sub-models based on the capability of the first IoT device 100a.

Further, the processor 110 may assign remaining sub-models from the plurality of sub-models to at least one another IoT device 100b-100n in the blockchain-based IoT network and obtain the output data of the remaining sub-models processed by the at least one another IoT device 100b-100n. Further, the processor 110 may generate the response for the query by processing the output data of the at least one sub-models processed by the processor 110 included in the IoT device 100a and the output of the remaining sub-models processed by the at least one another IoT device 100b-100n.

In an embodiment, the processor 110 may assign the remaining sub-models to the at least one another IoT device 100b-100n in the blockchain-based IoT network by identifying the at least one another IoT device 100b-100n for processing the remaining sub-models based on at least one of capacity, the neighbor IoT device 100b-100n of the IoT device 100a, and the priority set by the user, and executing at least one smart contract between the IoT device 100a and the at least one identified another IoT devices 100b-100n for processing the remaining sub-models.

In an embodiment, the processor 110 may aggregate each of the output data of the at least one sub-models processed by the at least one another IoT device 100b-100n and the output of the at least one sub-model processed by the IoT device 100a to generate the trained machine learning model. Further, the processor 110 may generate the response for the query by processing the output data of the at least one sub-model processed by the processor 110 included in the IoT device 100a and the output of the remaining sub-models processed by the at least one another IoT device 100b-100n.

In an embodiment, the processor 110 includes a ML data dividing unit, a ML-sub-model processing unit, a ML-sub-model process assigning unit, and a response generation unit used for processing the ML model on the block-chain based IoT network.

The communicator 120 is configured for communicating with the processor 110 to process the ML data on the blockchain-based IoT) network.

The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "nontransitory" may indicate that the storage medium is not embodied in a carrier wave or a propagated signal. However, the term "non-transitory" should not be interpreted that the memory 130 is non-movable. In some examples, the memory 130 may be configured to store larger amounts of information than the memory. In certain examples, a non-transitory storage medium may store data that can, over time, change (e.g., in Random Access Memory (RAM) or cache).

Although the FIG. 4a shows various hardware components of the IoT device 100a-100n but it is to be understood that other embodiments are not limited thereon. In another embodiment, the IoT device 100a-100n may include less or more number of components. Further, the labels or names of the components are used only for illustrative purpose and does not limit the scope of the invention. One or more components may be combined together to perform same or substantially similar function for IoT devices to process data assitively based on capability of the IoT devices in the distributed ledger network 1000.

FIG. 4b shows various hardware components of the processor included in the IoT devices 100a-100n, according to an embodiment as disclosed herein. In an embodiment, the processor 110 includes a query analyser 110a, a data divider 110b, a capability identifier 110c, a data aggregator 110*d*, a smart contract executor 110*e* and a block-chain based response modeller 110*e*.

The query analyser 110*a* may receive the query from the user and determine the ML data or non-ML to process the query. Further, the data divider 110*b* may divide the ML data or non-ML into the plurality of sub-models. Further, the capability identifier 110*c* may identify the plurality of IoT devices 100*b*-100*n* having capacity to process at least one sub-models of the ML data or non-ML data. A smart contract executor 100*e* may execute the smart contract between the first IoT device 100*a* and the at least one IoT device from the plurality of IoT devices 100*b*-100*n* for processing the at least one sub-models of the plurality of the sub-models.

Further, the block-chain based response modeller 110*f* may assign remaining sub-models from the plurality of sub-models to at least one another IoT device 100*b*-100*n* and obtain the output data of the remaining sub-models processed by the at least one another IoT device 100*b*-100*n*. Further, the block-chain based response modeller 110*f* may generate the response for the query by processing the output data of the at least one sub-models processed by the processor 110 included in the IoT device 100*a* and the output of the remaining sub-models processed by the at least one another IoT device 100*b*-100*n*.

In an embodiment, the block-chain based response modeller 110*f* may assign the remaining sub-models to the at least one another IoT device 100*b*-100*n* in the blockchain-based IoT network by identifying the at least one another IoT device 100*b*-100*n* for processing the remaining sub-models based on at least one of capacity, the neighbor IoT device 100*b*-100*n* of the IoT device 100*a*, and the priority set by the user, and executing at least one smart contract between the IoT device 100*a* and the at least one identified another IoT devices 100*b*-100*n* for processing the remaining sub-models.

4. In an embodiment, the block-chain based response modeller 110*f* may aggregate each of the output data of the at least one sub-models processed by the at least one another IoT device 100*b*-100*n* and the output of the at least one sub-model processed by the IoT device 100*a* to generate the trained machine learning model. Further, the block-chain based response modeller 110*f* may generate the response for the query by processing the output data of the at least one sub-model processed by the processor 110 included in the IoT device 100*a* and the output of the remaining sub-models processed by the at least one another IoT device 100*b*-100*n*.

Although the FIG. 4*b* shows various hardware components of the processor 110 but it is to be understood that other embodiments are not limited thereon. In another embodiment, the processor 110 may include less or more number of components. Further, the labels or names of the components are used only for illustrative purpose and does not limit the scope of the invention. One or more components may be combined together to perform same or substantially similar function for IoT devices to process data in the distributed ledger network 1000.

5. FIG. 5*a* is a flowchart illustrating a method of processing the ML data on the distributed ledger network according to an embodiment, and FIG. 5*b* is a flowchart illustrating a method of processing the ML data by using a smart contract according to an embodiment. Steps 502*a*-514*a* may be processed by the processor 110.

At 502*a*, the method includes receiving, by the first IoT device 100*a* in the distributed ledger network, the query from the user. At 504*a*, the method includes determining the ML data to process the query. At 506*a*, the method includes dividing the ML data into the plurality of sub-models. At 508*a*, the method includes identifying the plurality of IoT devices having capacity to process at least one sub-models of the ML data. At 510*a*, the method includes executing the smart contract between the first IoT device 100*a* and the at least one IoT device from the plurality of IoT devices 100*b*-100*n* for processing the at least one sub-models of the plurality of the sub-models.

At 512*a*, the method includes assigning the sub-models from the plurality of sub-models to at least one IoT device of the IoT devices 100*b*-100*n* in the blockchain-based IoT network. At 514*a*, the method includes obtaining the output data of the remaining sub-models processed by the at least one IoT device. At 516*a*, the method includes generating the response for the query by processing the output data of the at least one sub-models processed by the first IoT device 100*a* and the output of the remaining sub-models processed by the at least one IoT device.

Steps 502*b*-516*b* may be processed by the processor 110. At 502*b*, the method includes receiving the query from the user. At 504*b*, the method identifying non-ML data for processing the query. At 506*b*, the method dividing the non-ML data into the plurality of sub-models.

At 508*b*, the method identifying the plurality of IoT devices 100*b*-100*n* having capacity to process at least one sub-models of the non-ML data. At 510*b*, the method executing the smart contract between the first IoT device 100*a* and the at least one IoT device from the plurality of IoT devices 100*b*-100*n* for processing the at least one sub-models of the plurality of the sub-models.

At 512*b*, the method assigning at least one sub-models from the plurality of sub-models to the at least one IoT device from the plurality of IoT devices 100*b*-100*n* based on the smart contract. At 514*b*, the method obtaining the output data of the processed sub-models of the non-ML data from each of the IoT devices. At 516*b*, the method generating the response for the query by processing the output data of the at least one sub-models processed by the first IoT device 100*a* and the output of the sub-models processed by the at least one IoT device.

The various actions, acts, blocks, steps, or the like in the flowcharts 500*a* and 500*b* may be performed in the order presented, in a different order or simultaneously. Further, in some embodiments, some of the actions, acts, blocks, steps, or the like may be omitted, added, modified, skipped, or the like without departing from the scope of the invention.

FIG. 5*c* is a flowchart illustrating a method performed at an electronic device according to an embodiment.

At 502*c*, a dataset may be identified at an electronic device. The electronic device may be the first IoT device 100*a*. The dataset may be identified in response to an input. The input may be a query. The input may be input by a user or received from the user.

In an embodiment, the dataset may include ML data. The dataset may include non-ML data. The dataset may include both of the ML data and the non-ML data, but is not limited thereto. The ML data may be an ML model.

At 504*c*, the dataset may be divided into sub-datasets. When the dataset is or include ML data, the divided sub-datasets may be or include ML sub-models.

At 506*c*, at least one electronic device may be identified. The identified at least one electronic device may be at least one of the IoT devices 100*b*-100*n*. The identified at least one electronic device may process at least one sub-datasets.

At 508*c*, the at least one sub-dataset may be assigned to the at least one electronic device. The at least one electronic device may process the assigned at least one sub-dataset.

Each of the at least one electronic device may process each of the at least one sub-dataset.

At 510c, at least one output of the processed at least one sub-dataset may be received from the at least one electronic device. The received at least one output may be used to generate a response to the input. In an embodiment, the electronic device may also process a sub-dataset. The sub-datasets processed at the at least one electronic device and the electronic device are different and divided from the dataset.

In an embodiment, the at least one output may be added as a block in a distributed ledger network, and consisting of a blockchain. The at least one output may be aggregated to generate a ML model. The generated ML model may be used to generate the response to the input. When the input includes a label input and a non-label input, each output for each input may be aggregated.

In an embodiment, a smart contract between the electronic device and the at least one electronic device may be generated to process the sub-dataset. The sub-dataset may be assigned based on the generated smart contract. The output of the processed sub-dataset may be verified based on the smart contract on a distributed ledger network.

In an embodiment, the electronic device may identify the at least one electronic device based on processing capability of the at least one electronic device. The at least one electronic device that has processing capability to process the sub-dataset may be identified among a plurality of electronic devices. The identified at least one electronic device may process the sub-dataset.

In an embodiment, the electronic device may identify the at least one electronic device based on information of a user. The information of the user may be the user's profile information, the user's preference information, the user's behavior pattern information, the users' routine information, the user's calendar information, but is not limited thereto. The identified at least one electronic device may process the sub-dataset.

In an embodiment, the electronic device may identify the at least one electronic device based on a context associated with the dataset.

In an embodiment, the electronic device may identify the at least one electronic device based on a predetermined criteria when at least two users are detected. FIG. 6a is a diagram for explaining washing machine personalization according to an embodiment, and FIG. 6b is a diagram for explaining the use of a smart contract according to an embodiment.

The washing machine personalization may be performed according to an embodiment. For example, the table 1 indicates various devices and corresponding device profile data. Further, the device logs for the users (i.e., User 1, washing machine, Wednesday 7 am (morning), Colored, Regular, Warm; User 2, washing machine, Wednesday 10 am (morning), Whites, Regular, Warm; User 1, washing machine, Sunday 5 pm (evening), Delicates, Cold; and User 2, washing machine, Wednesday 8 am (morning), Colored, Regular, Warm). According to an embodiment, the IoT device 100a may create a distributed association rule mining information and association rules. The ML data may include the distributed association rule mining information and the association rules. In an example, based on the association rules, the washing machine personalization for the user 2 may be determined as frequent time of day: morning, frequent days of week: Wednesday, Fabric Type: Whites/Colored, Cycle: Regular, temperature: Warm, and the washing machine personalization for the user 1 may be determined as frequent time of day: morning, frequent days of week: Wednesday, Sunday, Fabric Type: Colored, Cycle: Regular, temperature: Warm.

TABLE 1

| Device Type | Device Profile Data |
| --- | --- |
| Washing Machine | Day of the week, Time, Type of fabric, Cycle, Water temperature |
| Fridge | Average Temperature, Time of Use, Duration, No. of times in a day door opened |
| Microwave | Use Frequency, Temperature Set, Average time of use |
| Lightbulb | Brightness/Luminescence |
| AC | Temperature setting |
| TV | Number of times used each day, what time of use, how long used |

The washing machine, the smart TV, and the smart bulb link at least one smart contract to the blockchain infrastructure. In order to process the ML data, according to an embodiment, the processor 110 included in the washing machine may divide the ML data into the plurality of sub-models and process at least one sub-model from the plurality of sub-models based on the capability of the smart washing machine. Further, the processor 110 may assign remaining sub-models from the plurality of sub-models to the smart bulb and smart TV in the blockchain-based IoT network.

The processor 110 included in the washing machine may obtain the output data of the remaining sub-models processed by the smart bulb and smart TV. Further, the processor 110 included in the washing machine may generate the response for the query by processing the output data of the at least one sub-models processed by the processor 110 included in the washing machine and the output of the remaining sub-models processed by the smart bulb and smart TV. The output data of the at least one sub-models processed by the washing machine and the output of the remaining sub-models processed by the smart bulb and smart TV may be aggregated to generate the response to the input or the query.

1. In an example, in the blockchain-based IoT network, the association rules of the transaction may be defined in terms of contracts. For example, the contract is defined as follows:

Call_profile_for_user (username, device_type)

Hence, if the device type is DEVICE_LIGHTBULB and username is USER_A, the following contract may be executed:

Call_profile_for_user (USER_A, DEVICE_LIGHTBULB)

In another example, the IoT device 100a may analyze personalization information for each user with respect to each device type, and generate device user profile for each user with respect to each device type. The generated device user profile may be stored in the blockchain. The personalization procedure may use device logs for each device as inputs and produce outputs of the user device profile for each user for the given device. The generation of the IoT user profile for each device type may be performed on an IoT hub and other IoT devices 100b-100n on the IoT network. The IoT device 100a may be the IoT hub.

In another example, in case of multiple users in the same home, the minimum and maximum setting values used by the users may be used to determine a mutually acceptable value for the device setting of the IoT devices 100a-100n connected to the hub. According to an embodiment, predefined rules may be used to create the device user profile on the hub. In an embodiment, the predefined rules may be defined by each user.

For example, the following may be extracted from the usage log for the smart washing machine:
- a) 20 minutes on Wednesday 7 am (morning) by the first user,
- b) 30 minutes on Wednesday 10 am (morning) by the second user,
- c) 20 minutes on Sunday 5 pm (evening) by the first user, and
- d) 10 minutes on Wednesday 8 am (morning) by user 1.

An example rule is as follows:

Within the last month, if the smart washing machine is used for more than 5 minutes continuously and the same pattern is observed for at least 2 times, then the smart washing machine may update the user device profile for the user and device with the most frequent time of day and 2 most frequent days of week.

The rules may be programmed and applied on the smart hub and devices connected to the hub. The profile information for all users and for all connected devices may be analyzed once a month and stored on the Interplanetary File System (IPFS). The IPFS is a protocol to store and share distributed content, and is frequently used on the blockchain.

By applying this rule, the updated user device profile is as follows:
- a) (Second User, Washing machine, frequent time of day: morning, frequent days of week: Wednesday)
- b) (First User, Washing machine, frequent time of day: morning, frequent days of week: Wednesday, Sunday)

This created device user profile for the washing machine may be stored in the IPFS. Below is sample of an JSON code for the user device profiles, which is prepared by the hub and stored in the IPFS.

{
"user_id":"user_1"
"Washing machine":
{
"frequent time of day":"morning",
"frequent days of week":"Wednesday"
},
"TV":
{
"frequent time of day":["evening", "night"],
"frequent days of week": "Wednesday"}
}
}

In another example, whenever the user enters the smart home, the following actions may take place according to an embodiment.

The smart sensor may identify the user by associating his mobile phone or by using sensors. Presence of the user may be determined in either of the following ways:
- a) Implicitly, by inferring a person from their activity profile, and
- b) Explicitly, by asking a person's smartphone to identify the person when he enters a room, use a new device, or log in to the hub using his smartphone.

After identifying the user, the stored user device profile may be fetched from the blockchain in the following way: the smart hub may use the stored hash to obtain the transaction message from the blockchain (e.g., Ethereum). This first hash may be used to read the user profile information from the IPFS, which is then used to determine the settings to be applied on the smart device. Finally, the fetched profile parameters/settings may be applied to the smart device.

In another example, according to an embodiment, if there are multiple users present in a room, the IoT device 100 may resolve conflicts based on its settings which is any of the following:
- a. First come first serve (FCFS): The settings of the user who first enters the room are applied, until the user leaves the room,
- b. Last come first serve (LCFS): The settings of the user who enters the room in the last are applied, and
- c. Mean or Median: In case the setting value is numerical (such as AC temperature), the mean or median of the settings is taken. In case it is categorical, a voting system may be used and the setting with the most votes may be applied.

FIG. 7 is a diagram for explaining a navigation system according to an embodiment.

According to an embodiment, the navigation system in the smart car may provide a recommendation to the user based on the ML data. The ML data is trained by using the real time traffic data, the user data from the electronic device, a car data using on board display (OBD) and user personal calendar data. An output of the ML data may be obtained by processing an output data of the at least one sub-models processed by the processor 110 included in the smart car and the output of the remaining sub-models processed by another device, so that the navigation system provides a personalized recommendation to the user based on the ML data. The other device may be included in the smart car, but is not limited thereto.

FIG. 8 is a diagram for explaining a virtual assistance application using a server. In this method, the user may speak out a command of "Turn backlights ON" to a virtual assistance application. The virtual assistance application may send the command to a cloud server, and the machine learning model is used to find a response corresponding to the command. The cloud server may send the response to the virtual assistance application. The virtual assistance application may forward the response to the corresponding device (e.g., smart bulb, smart TV, smart washing machine or the like) to cause the corresponding device to perform a function corresponding to the command.

FIG. 9 is a diagram for explaining an example scenario of the virtual assistance application according to an embodiment. According to an embodiment, the user may speak out a command of "Turn backlights ON" to the virtual assistance application. The virtual assistance application processes the command in the IoT environment without connecting to the cloud server. Further, the machine learning model may be used to find a response corresponding to the command of the user. A corresponding function may be executed on the corresponding IoT device (e.g., smart bulb).

FIG. 10 is a diagram for explaining a guest verification procedure. According to this method, the security person needs to call the home owner to ask if the home owner is expecting a visitor. Based on the response, the guest verification procedure is completed manually.

Figure 12:
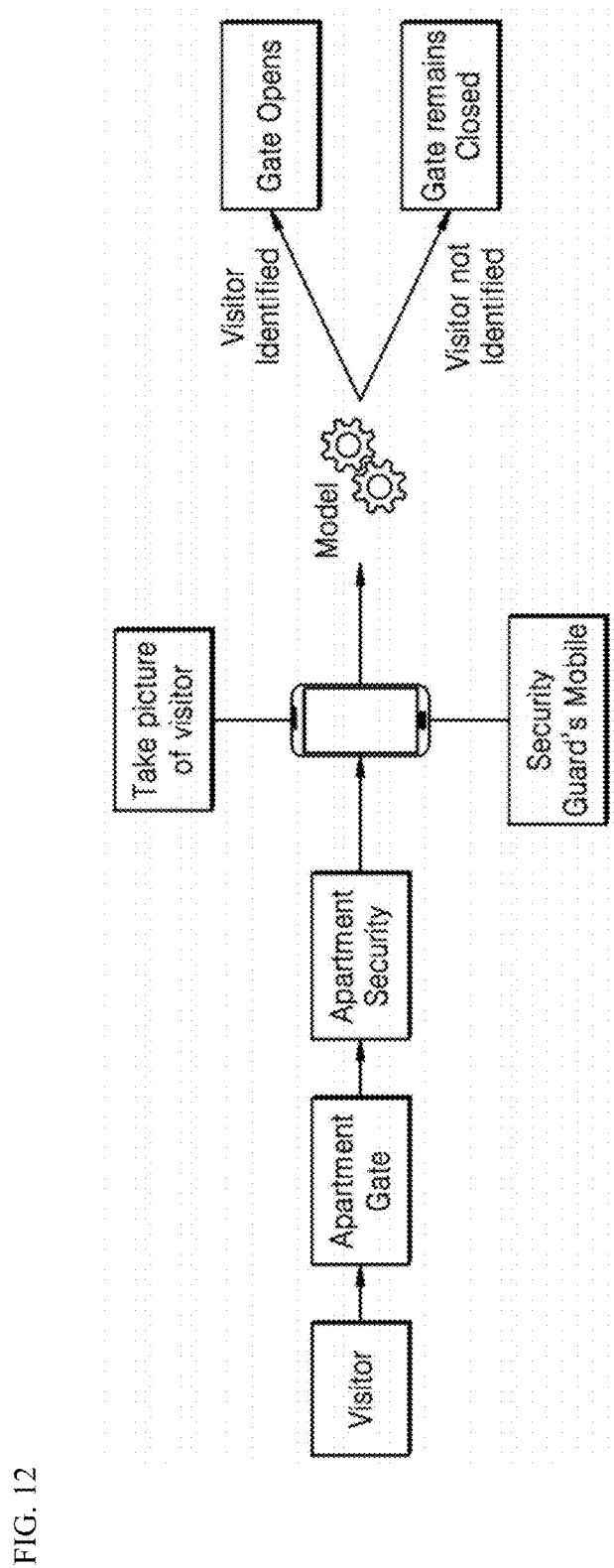
FIG. 12 is a diagram for explaining a guest verification procedure according to an embodiment.

FIG. 11 is a diagram for explaining a guest verification procedure according to an embodiment, and FIG. 12 is a diagram for explaining a guest verification procedure according to an embodiment.

As shown in the FIG. 11, according to an embodiment, the guest verification may be performed by a security guard's capturing photo of the visitor and processing the photo in the IoT environment. Based on the processing, when the visitor is identified correctly in any of the IoT devices then the gate will be opened. According to an embodiment, the photo may not be sent to any external device out of the IoT environment, which may enhance the security and privacy in an effective manner.

As shown in the FIG. 12, the guest verification may be performed by the security guard's capturing the photo of the visitor and processing the photo in the IoT environment using the ML model. Based on the processing, when the visitor is identified correctly in any of the IoT devices then the gate will be opened. According to an embodiment, the photo is not shared with any external device out of the IoT environment, which may enhance the security and privacy in an effective manner.

Figure 13:
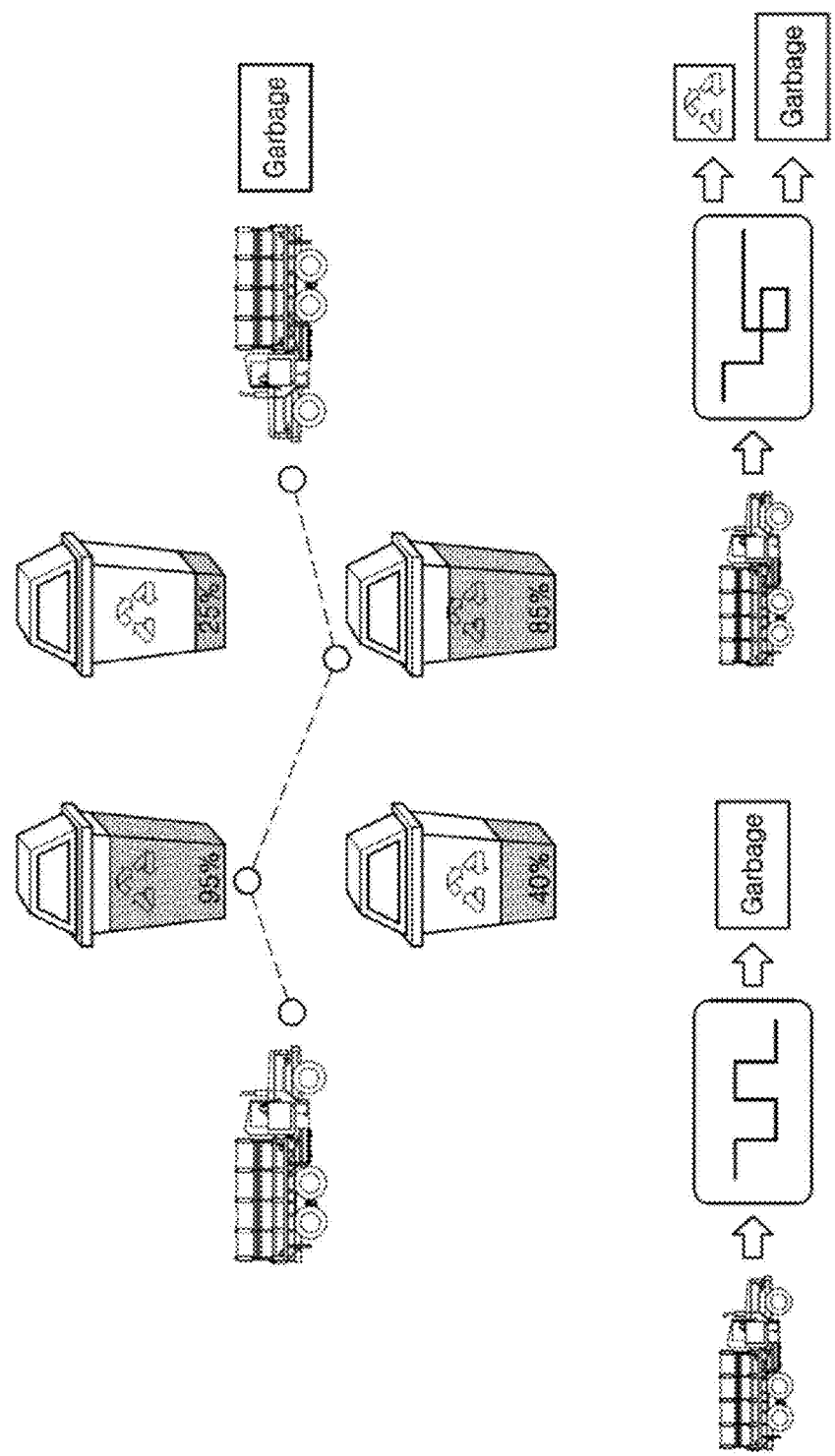
FIG. 13 is a diagram for explaining smart garbage collection according to an embodiment.

FIG. 13 is a diagram for explaining smart garbage collection according to an embodiment. For example of smart garbage collection, when a container has an IoT sensor, the distributed ML may be used to calculate an optimized garbage collection route by using outputs from the IoT fill sensor. Further, the container may inform a truck where to go. This results in reducing the work load and allowing the garbage to be collected effectively.

Figure 14:
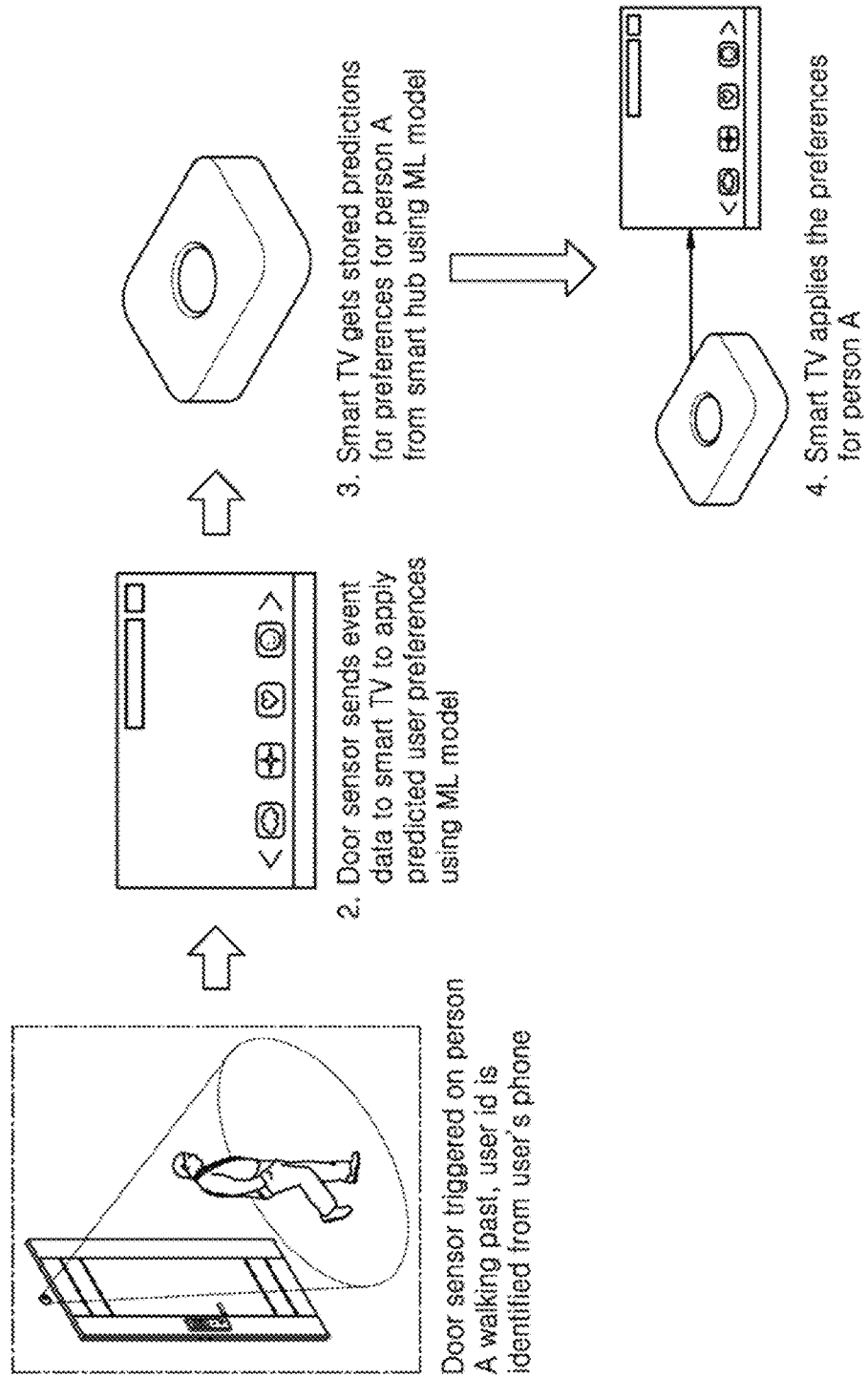
FIG. 14 is a diagram for explaining a smart home according to an embodiment.

FIG. 14 is a diagram for explaining a smart home according to an embodiment.

When different people living in shared house/office have different IoT device preferences (i.e., a first user wants air conditioner (AC) to be set as 20 degrees and a second user wants 30 degrees). According to an embodiment, when a person enters a smart home, a door sensor may be triggered based on the person walking past toward the smart home, and the user identification may be identified from user's phone. Further, the door sensor may send event data to a smart TV to apply predicted user preferences of the identified person by using the ML model. The smart TV may obtain stored predictions for preferences for the person and apply the preferences for the person to its setting.

FIG. 15 is a diagram for explaining smart fuel saving in a car according to an embodiment.

In an example, an IoT minor may predict fuel saving by using a mirror data ML model. An IoT light may predict fuel saving by using light data ML model, IoT door predicts fuel saving, Tablet/phone predicts fuel saving using engine speed data ML model, and IoT wheel may predict fuel saving by using wheel pressure data ML model, the fuel saving prediction may be performed based on the mirror data ML model, the light data ML model, the engine speed data ML model, and the wheel pressure data ML model.

In another example, the proposed method may be used to provide equitable sharing of resources in a shared household, which may be used to split the electricity bill based on actual usage of devices, or as per some other arrangement (such as where the owner and renters live in same house and the owner does not need to pay but renters do). Here, once each user is identified for each device, the length of time may be billed in virtual currency to each user. At the end of each month, the virtual currency usage for each person is logged and the total bill for the shared household may be divided based on the actual usage of the devices by each user.

In another example, the proposed method may be used to provide a water distribution management in a smart building. Here the water usage for each flat in the building may be determined with help of sensors fitted to water pipelines or taps, and accordingly the water distribution and water bill may be inferred for each flat.

FIG. 16 is a diagram for explaining division of a machine learning model via forking according to an embodiment.

The IoT device (e.g., smart bulb) may receive the input data and passes it to the smart hub. The smart hub may create the smart contracts and fork it to other nodes (i.e., other IoT devices). The smart contract may be defined to compute error gradients using a stochastic gradient descent (SGD) procedure. The other nodes may send the aggregated updated weight matrix to the smart hub. The updated weight matrix may be stored on the IPFS. The IPFS may send the transaction message to a blockchain platform (e.g., Ethereum). The hash of weight matrix may be stored on a blockchain in the smart hub. Ethereum may send another transaction message to the smart hub.

In general, the hash of the device user profile information stored on the IPFS may be stored in Ethereum blockchain as a transaction message. The Ethereum network computes a second hash based on the transaction message which is stored in the smart hub.

FIG. 17 is a diagram for explaining an ML prediction using a blockchain according to an embodiment.

The IoT device (e.g., smart bulb) may receive the input data and pass it to the smart hub. The smart hub may create and fork the smart contracts to other nodes (i.e., other IoT devices). The smart hub may store the hash value of weight matrix and send the hash value of weight matrix to a blockchain (e.g., Ethereum). Ethereum may send another transaction message in the form of the hash value to the distributed storage. The distributed storage may send the weight matrix to the smart hub.

Figure 18:
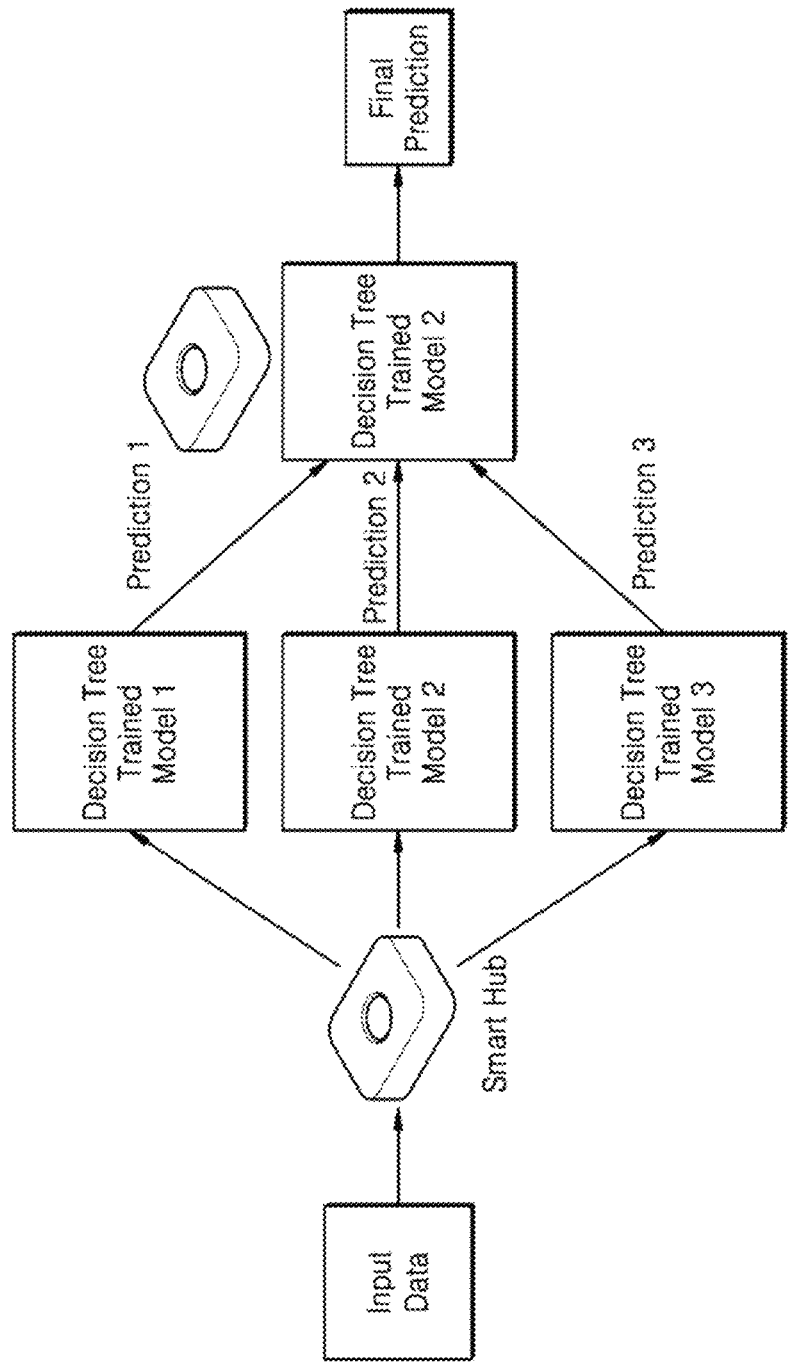
FIG. 18 is a diagram for explaining a random forest on a blockchain according to an embodiment.

FIG. 18 is a diagram for explaining a random forest on a blockchain according to an embodiment, and FIG. 19 is a diagram for explaining a decision tree trained model working as a smart contract on a node in the blockchain according to an embodiment.

As shown in the FIG. 18 and FIG. 19, the IoT device may implements each decision tree trained model computation as the smart contract on the node which is stored on the IPFS. The hash of each block may be stored on the blockchain. The decision tree smart contract in the nodes may be used to predict class given an input and to fork the computation to next node. The final block smart contract (running on the smart hub) may be for majority voting. The smart contract in the majority voting block is to perform the voting and get final prediction.

In the random forest model, there is an ensemble of decision tree models and the majority of votes is taken as the predicted class.

FIG. 20 is a diagram for explaining a deep neural network (DNN) on blockchain according to an embodiment.

In the DNN model, there may be multiple nodes in the input, hidden, output layers, and each node may perform a nonlinear computation (such as Sigmoid or RELU). According to an embodiment, the IoT device may use the weight matrix of each layer (input layer, hidden layer, and output layer) as a smart contract computation in the node in the blockchain. The smart contract in each node is to (a) Forward phase: compute product of weight matrix with the input vector in the forward pass (b) Backward phase: modify weights after back propagating the errors in the forward phase. Each block performs its computation or forks it to a neighboring node The various actions, acts, blocks, steps, or the like in the flowchart may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

The invention claimed is:

1. An internet of things (IoT) device comprising:
a memory storing instructions; and
at least one processor configured to execute the instructions to:
in response to an input, identify a dataset of usage data generated by the IoT device to be processed for responding to the input;
divide the dataset into a plurality of sub-datasets by forking at least one smart contract;
identify at least one other IoT device which processes at least one sub-dataset of the plurality of sub-datasets, wherein the at least one other IoT device is identified as having capacity to process the at least one sub-dataset based on user information, the user information comprising profile information of a user, behavior pattern information of the user, routine information of the user, or calendar information of the user;
assign the at least one sub-dataset to the at least one other IoT device to process the at least one sub-dataset and generate at least one processed sub-dataset; and
receive, from the at least one other IoT device, at least one output of the at least one processed sub-dataset to generate a response to the input.

2. The IoT device of claim 1, wherein the at least one output of the at least one processed sub-dataset is added as a block in a distributed ledger network.

3. The IoT device of claim 1, wherein the at least one processor is further configured to execute the instructions to:
generate a smart contract with the at least one other IoT device to process the at least one sub-dataset; and
assign the at least one sub-dataset to the at least one other IoT device based on the smart contract with the at least one other IoT device, and
wherein the at least one output of the at least one processed sub-dataset is verified on a distributed ledger network based on the smart contract with the at least one other IoT device.

4. The IoT device of claim 1, wherein the dataset comprises a machine learning (ML) model, and the plurality of sub-datasets comprises a plurality of sub-models.

5. The IoT device of claim 1, wherein the at least one processor is further configured to execute the instructions to:
process a sub-dataset to produce a local output; and
aggregate the local output, and the at least one output of the at least one processed sub-dataset to generate an aggregation of outputs and the response to the input.

6. The IoT device of claim 5, wherein the at least one processor is further configured to execute the instructions to:
generate a ML model based on the aggregation of outputs to generate the response to the input by using the ML model.

7. The IoT device of claim 5, wherein the input is divided into a label input and a non-label input, and each output for each divided input are aggregated to generate the response to the input.

8. The IoT device of claim 1, wherein the at least one other IoT device is identified based on processing capability of the at least one other IoT device.

9. The IoT device of claim 1, wherein the at least one processor is further configured to execute the instructions to detect a context associated with the dataset, wherein the at least one other IoT device is identified based on the context associated with the dataset.

10. The IoT device of claim 1, wherein the at least one other IoT device is identified based on a predetermined criteria when at least two users are detected by the IoT device.

11. A method comprising:
in response to an input, identifying a dataset of usage data generated by an internet of things (IoT) device to be processed for responding to the input;
dividing the dataset into a plurality of sub-datasets by forking at least one smart contract;
identifying at least one other IoT device which processes at least one sub-dataset of the plurality of sub-datasets, wherein the at least one other IoT device is identified as having capacity to process the at least one sub-dataset based on user information, the user information comprising profile information of a user, behavior pattern information of the user, routine information of the user, or calendar information of the user-of a user;
assigning the at least one sub-dataset to the at least one other IoT device to process the at least one sub-dataset and generate at least one processed sub-dataset; and
receiving, from the at least one other IoT device, an output of the at least one processed sub-dataset to generate a response to the input.

12. A method performed by an internet of things (IoT) device, the method comprising:
receiving from another IoT device a sub-dataset divided from a dataset which is identified, at the other IoT device, for responding to an input, the dataset being of usage data generated by the other IoT device;
processing the sub-dataset to produce an output; and
transmitting, to the other IoT device, the output to generate a response to the input,
wherein the sub-dataset is divided by forking at least one smart contract, and
wherein the IoT device has been identified to receive the sub-dataset based on user information, the user information comprising profile information of a user, behavior pattern information of the user, routine information of the user, or calendar information of the user.

13. A non-transitory computer readable medium comprising instructions which, when the instructions are executed by at least one processor, cause the at least one processor to carry out the method of claim 12.

14. The IoT device of claim 3, wherein the smart contract with the at least one other IoT device defines a rule of transaction between the IoT device and the at least one other IoT device.

15. The IoT device of claim 3, wherein the smart contract with the at least one other IoT device is linked to the distributed ledger network for the at least one other IoT device.

16. The IoT device of claim 3, wherein the at least one smart contract corresponds to the dataset,
   wherein the smart contract with the at least one other IoT device is generated by forking the at least one smart contract, and
   wherein the smart contract with the at least one other IoT device corresponds to the at least one sub-dataset.

17. The IoT device of claim 3, wherein the smart contract with the at least one other IoT device is executed for processing the at least one sub-dataset.

18. The IoT device of claim 1, wherein the input is received at the IoT device from another IoT device included in the at least one other IoT device.

19. A non-transitory computer readable medium comprising instructions which, when executed by at least one processor, cause the at least one processor to carry out the method of claim 11.

\* \* \* \* \*